(12) United States Patent
Flores et al.

(10) Patent No.: US 9,346,949 B2
(45) Date of Patent: May 24, 2016

(54) HIGH REFLECTANCE POLYCARBONATE

(71) Applicant: SABIC Innovative Plastics IP B.V., Bergen op Zoom (NL)

(72) Inventors: Amanda Marie Flores, Mount Vernon, IN (US); Vandita Pai-Paranjape, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/765,307

(22) Filed: Feb. 12, 2013

(65) Prior Publication Data
US 2014/0226342 A1    Aug. 14, 2014

(51) Int. Cl.
| | | |
|---|---|---|
| C08L 69/00 | (2006.01) |
| C08K 3/22 | (2006.01) |
| F21V 7/22 | (2006.01) |
| C08K 9/02 | (2006.01) |
| C08K 9/08 | (2006.01) |
| C08G 77/448 | (2006.01) |

(52) U.S. Cl.
CPC . *C08L 69/00* (2013.01); *C08K 3/22* (2013.01); *C08K 9/02* (2013.01); *C08K 9/08* (2013.01); *F21V 7/22* (2013.01); *C08G 77/448* (2013.01); *C08K 2003/2241* (2013.01); *C08K 2201/011* (2013.01)

(58) Field of Classification Search
CPC .............. C08L 69/00; C08K 3/22; F21V 7/22
See application file for complete search history.

(56) References Cited

U.S. PATENT DOCUMENTS

| | | |
|---|---|---|
| 489,803 A | 1/1893 | Gillespie et al. |
| 825,010 A | 7/1906 | Snow |
| 3,049,568 A | 8/1962 | Apel et al. |
| 3,394,089 A | 7/1968 | McNutt et al. |
| 3,673,262 A | 6/1972 | Prahl et al. |
| 3,839,247 A | 10/1974 | Bialous et al. |
| 4,045,379 A | 8/1977 | Kwantes et al. |

(Continued)

FOREIGN PATENT DOCUMENTS

| | | |
|---|---|---|
| CN | 101205358 A | 6/2008 |
| CN | 101885907 A | 11/2010 |

(Continued)

OTHER PUBLICATIONS

Ishihara Sangyo KK-2 (Titanium Dioxide Products: WHITE Pigments, Ishihara Sangyo KK, 2012, 7 pages).*

(Continued)

*Primary Examiner* — Brieann R Fink
(74) *Attorney, Agent, or Firm* — Cantor Colburn LLP

(57) ABSTRACT

In an embodiment, a reflector comprises a polycarbonate composition, the polycarbonate composition comprises: polycarbonate; 10 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm. A molded article of the polycarbonate has transmission level greater than or equal to 90.0% at 2.5 mm thickness as measured by ASTM D1003-00 and a yellow index (YI) less than or equal to 1.5 as measured by ASTM D1925.

19 Claims, 1 Drawing Sheet

LED

(56) References Cited

U.S. PATENT DOCUMENTS

| | | | |
|---|---|---|---|
| 4,052,466 A | 10/1977 | Sun | |
| 4,076,686 A | 2/1978 | Calkins | |
| 4,191,843 A | 3/1980 | Kwantes et al. | |
| 4,294,995 A | 10/1981 | Faler et al. | |
| 4,308,404 A | 12/1981 | Kwantes et al. | |
| 4,308,405 A | 12/1981 | Kwantes | |
| 4,346,247 A | 8/1982 | Faler et al. | |
| 4,365,099 A | 12/1982 | Faler et al. | |
| 4,391,997 A | 7/1983 | Mendiratta | |
| 4,396,728 A | 8/1983 | Faler | |
| 4,400,555 A | 8/1983 | Mendiratta | |
| 4,423,252 A | 12/1983 | Maki et al. | |
| 4,424,283 A | 1/1984 | Faler et al. | |
| 4,455,409 A | 6/1984 | Faler et al. | |
| 4,478,956 A | 10/1984 | Maki et al. | |
| 4,584,416 A | 4/1986 | Pressman et al. | |
| 4,590,303 A | 5/1986 | Mendiratta | |
| 4,595,704 A | 6/1986 | Fazio | |
| 4,820,740 A | 4/1989 | Li | |
| 4,822,923 A | 4/1989 | Li | |
| 4,918,245 A | 4/1990 | Iimuro et al. | |
| 5,015,784 A | 5/1991 | Rudolph et al. | |
| 5,064,885 A | 11/1991 | Muller et al. | |
| 5,087,767 A | 2/1992 | Okamoto et al. | |
| 5,212,206 A | 5/1993 | Rudolph et al. | |
| 5,233,096 A | 8/1993 | Lundquist | |
| 5,284,981 A | 2/1994 | Rudolph et al. | |
| 5,288,926 A | 2/1994 | Patrascu et al. | |
| 5,302,774 A | 4/1994 | Berg et al. | |
| 5,364,895 A | 11/1994 | Stevenson et al. | |
| 5,395,857 A | 3/1995 | Berg et al. | |
| 5,414,151 A | 5/1995 | Pressman et al. | |
| 5,414,152 A | 5/1995 | Cipullo | |
| 5,424,006 A | 6/1995 | Murayama et al. | |
| 5,438,086 A | 8/1995 | Stevenson et al. | |
| 5,455,282 A | 10/1995 | Berg et al. | |
| 5,463,140 A | 10/1995 | Wehmeyer et al. | |
| 5,470,938 A | 11/1995 | Sakashita et al. | |
| 5,475,154 A | 12/1995 | Lundquist et al. | |
| 5,502,153 A * | 3/1996 | Sakashita et al. | 528/198 |
| 5,530,062 A | 6/1996 | Bradtke et al. | |
| 5,589,517 A | 12/1996 | Sugawara et al. | |
| 5,631,338 A | 5/1997 | Inoue et al. | |
| 5,672,664 A | 9/1997 | DeRudder et al. | |
| 5,698,600 A | 12/1997 | Wulff et al. | |
| 5,747,632 A | 5/1998 | Adachi et al. | |
| 5,780,690 A | 7/1998 | Berg et al. | |
| 5,783,733 A | 7/1998 | Kissinger | |
| 5,837,757 A * | 11/1998 | Nodera et al. | 524/87 |
| 5,883,218 A | 3/1999 | Gordon et al. | |
| 5,914,431 A | 6/1999 | Fennhoff | |
| 5,939,494 A | 8/1999 | Wehmeyer et al. | |
| 6,066,861 A | 5/2000 | Hohn et al. | |
| 6,069,225 A | 5/2000 | Gerace et al. | |
| 6,133,190 A | 10/2000 | Wehmeyer et al. | |
| 6,174,987 B1 | 1/2001 | Gordon et al. | |
| 6,211,417 B1 | 4/2001 | Fengler et al. | |
| 6,329,556 B1 | 12/2001 | Sakura et al. | |
| 6,355,946 B1 | 3/2002 | Ishinaga | |
| 6,373,262 B1 | 4/2002 | Herring et al. | |
| 6,414,199 B1 | 7/2002 | Saruwatari | |
| 6,429,343 B1 | 8/2002 | Iwahara | |
| 6,486,222 B2 | 11/2002 | Kissinger et al. | |
| 6,512,148 B1 | 1/2003 | Yamamoto et al. | |
| 6,586,637 B2 | 7/2003 | Iwahara | |
| 6,613,823 B1 | 9/2003 | Battiste et al. | |
| 6,653,513 B1 | 11/2003 | Iwahara | |
| 6,653,613 B1 | 11/2003 | Bucourt et al. | |
| 6,664,313 B2 * | 12/2003 | Hirai et al. | 523/209 |
| 6,676,852 B2 | 1/2004 | Brown et al. | |
| 6,692,659 B2 | 2/2004 | Brown et al. | |
| 6,706,846 B2 | 3/2004 | Brack et al. | |
| 6,710,211 B1 | 3/2004 | Heydenreich et al. | |
| 6,716,368 B1 | 4/2004 | Schottland et al. | |
| 6,727,394 B2 | 4/2004 | Saruwatari | |
| 6,730,816 B2 | 5/2004 | Lundquist | |
| 6,740,784 B2 | 5/2004 | Iwahara et al. | |
| 6,995,294 B2 | 2/2006 | Webb et al. | |
| 7,112,702 B2 | 9/2006 | Carvill et al. | |
| 7,112,703 B2 | 9/2006 | Neumann et al. | |
| 7,129,382 B2 | 10/2006 | Iwahara et al. | |
| 7,148,313 B2 * | 12/2006 | Koga et al. | 528/196 |
| 7,227,046 B2 | 6/2007 | Commarieu | |
| 7,491,837 B2 | 2/2009 | Schlosberg et al. | |
| 7,852,428 B2 | 12/2010 | Byoun et al. | |
| 7,879,927 B2 | 2/2011 | Vlottes et al. | |
| 7,923,586 B2 | 4/2011 | Stahlbush et al. | |
| 7,939,591 B2 * | 5/2011 | Tomoda | 524/284 |
| 7,959,827 B2 | 6/2011 | Comanzo et al. | |
| 7,964,273 B2 | 6/2011 | Kogure et al. | |
| 7,989,531 B2 | 8/2011 | Bersted et al. | |
| 8,735,634 B2 | 5/2014 | Hasyagar et al. | |
| 2002/0115762 A1 | 8/2002 | Chung et al. | |
| 2002/0147256 A1 | 10/2002 | Eckel et al. | |
| 2003/0180542 A1 | 9/2003 | Pickett et al. | |
| 2003/0232957 A1 | 12/2003 | Silvi et al. | |
| 2004/0077820 A1 | 4/2004 | Silva et al. | |
| 2004/0116751 A1 | 6/2004 | Carvill et al. | |
| 2004/0181100 A1 | 9/2004 | Lundquist | |
| 2004/0227465 A1 | 11/2004 | Menkara et al. | |
| 2005/0035331 A1 | 2/2005 | Sun | |
| 2005/0070615 A1 | 3/2005 | Terajima et al. | |
| 2005/0113534 A1 | 5/2005 | Agarwal et al. | |
| 2005/0177007 A1 | 8/2005 | Neumann et al. | |
| 2005/0209434 A1 * | 9/2005 | Abad et al. | 528/196 |
| 2005/0215833 A1 | 9/2005 | Neumann et al. | |
| 2005/0261414 A1 | 11/2005 | Mitsuhashi et al. | |
| 2005/0272857 A1 | 12/2005 | Kawato et al. | |
| 2006/0047037 A1 | 3/2006 | Kawato et al. | |
| 2006/0135690 A1 | 6/2006 | Juikar et al. | |
| 2006/0159926 A1 | 7/2006 | Funaki et al. | |
| 2006/0247356 A1 | 11/2006 | Agarwal | |
| 2006/0263547 A1 | 11/2006 | Cojocariu et al. | |
| 2007/0004941 A1 | 1/2007 | Blaschke et al. | |
| 2007/0054110 A1 | 3/2007 | Kawato et al. | |
| 2007/0139949 A1 | 6/2007 | Tanda et al. | |
| 2007/0299169 A1 * | 12/2007 | Ohira et al. | 524/100 |
| 2008/0029720 A1 | 2/2008 | Li | |
| 2008/0081855 A1 | 4/2008 | Mullen | |
| 2008/0113117 A1 | 5/2008 | Coenjarts et al. | |
| 2008/0132614 A1 | 6/2008 | Jung et al. | |
| 2009/0043053 A1 | 2/2009 | Gorny et al. | |
| 2009/0054586 A1 | 2/2009 | Hein et al. | |
| 2009/0118406 A1 | 5/2009 | Tomoda | |
| 2009/0278444 A1 | 11/2009 | Forrest et al. | |
| 2010/0137549 A1 | 6/2010 | Takahashi et al. | |
| 2011/0127904 A1 | 6/2011 | Tsai | |
| 2011/0140593 A1 | 6/2011 | Negley et al. | |
| 2011/0151262 A1 | 6/2011 | Heuer et al. | |
| 2011/0278614 A1 | 11/2011 | Maier-Richter et al. | |
| 2012/0043552 A1 | 2/2012 | David et al. | |
| 2012/0126260 A1 | 5/2012 | Hussell et al. | |
| 2012/0131835 A1 | 5/2012 | Barrett et al. | |
| 2012/0248102 A1 | 10/2012 | van de Wetering et al. | |
| 2012/0252985 A1 | 10/2012 | Rosenquist et al. | |
| 2012/0283485 A1 | 11/2012 | Hasyagar et al. | |
| 2013/0035441 A1 | 2/2013 | De Brouwer et al. | |
| 2013/0094179 A1 | 4/2013 | Dai et al. | |
| 2013/0108820 A1 | 5/2013 | Belfadhel et al. | |
| 2013/0200415 A1 | 8/2013 | Evans et al. | |
| 2013/0221837 A1 | 8/2013 | De Brouwer et al. | |
| 2013/0265771 A1 * | 10/2013 | Flores et al. | 362/296.02 |
| 2013/0270591 A1 | 10/2013 | De Brouwer et al. | |
| 2013/0274391 A1 | 10/2013 | An et al. | |
| 2014/0051802 A1 | 2/2014 | De Brouwer et al. | |
| 2014/0051803 A1 | 2/2014 | De Brouwer et al. | |
| 2014/0117393 A1 | 5/2014 | Van Heerbeek et al. | |
| 2014/0339586 A1 | 11/2014 | Morizur et al. | |

(56) References Cited

U.S. PATENT DOCUMENTS

| | | | |
|---|---|---|---|
| 2015/0267059 A1 | 9/2015 | Florest et al. | |
| 2015/0318450 A1 | 11/2015 | De Brouwer et al. | |

FOREIGN PATENT DOCUMENTS

| | | |
|---|---|---|
| CN | 102134383 A | 7/2011 |
| CN | 202091807 | 12/2011 |
| DE | 102006016548 A1 | 10/2006 |
| EP | 0320658 A1 | 6/1989 |
| EP | 0475893 A1 | 3/1992 |
| EP | 0313165 B1 | 1/1993 |
| EP | 0523931 A2 | 1/1993 |
| EP | 0524731 A1 | 1/1993 |
| EP | 0693470 B1 | 5/1998 |
| EP | 0885929 A1 | 12/1998 |
| EP | 0676237 B1 | 3/1999 |
| EP | 1160229 A1 | 12/2001 |
| EP | 1201303 A1 | 5/2002 |
| EP | 1234845 A2 | 8/2002 |
| EP | 1273563 A1 | 1/2003 |
| EP | 0788839 B1 | 5/2003 |
| EP | 1371623 A1 | 12/2003 |
| EP | 1459805 A1 | 9/2004 |
| EP | 1500671 A1 | 1/2005 |
| EP | 2143750 | 1/2005 |
| EP | 1555296 A1 | 7/2005 |
| EP | 1222960 B1 | 8/2005 |
| EP | 1808726 A1 | 7/2007 |
| EP | 1925874 A1 | 5/2008 |
| EP | 1520617 B1 | 2/2009 |
| EP | 2248841 | 11/2010 |
| FR | 2685221 | 6/1993 |
| FR | 2685323 | 6/1993 |
| GB | 1377227 A | 12/1974 |
| JP | 5271132 | 10/1993 |
| JP | 5294875 | 11/1993 |
| JP | 5294876 | 11/1993 |
| JP | 3038910 | 2/1996 |
| JP | 08071433 A | 3/1996 |
| JP | 08319248 A | 12/1996 |
| JP | 08325185 A | 12/1996 |
| JP | 10211434 A | 8/1998 |
| JP | 10251180 A | 9/1998 |
| JP | 10314595 A | 12/1998 |
| JP | 10328573 A | 12/1998 |
| JP | 11179210 A | 7/1999 |
| JP | 11246458 A | 9/1999 |
| JP | 11255748 A | 9/1999 |
| JP | 2000281607 A | 10/2000 |
| JP | 2000281608 A | 10/2000 |
| JP | 2000319216 A | 11/2000 |
| JP | 2001233812 A | 8/2001 |
| JP | 2004149623 A | 5/2004 |
| JP | 2004231935 A | 8/2004 |
| JP | 2005037591 A | 2/2005 |
| JP | 2005048154 A | 2/2005 |
| JP | 2005082713 A | 3/2005 |
| JP | 2005115051 A | 4/2005 |
| JP | 2006339033 A | 12/2006 |
| JP | 2008184482 A | 8/2008 |
| JP | 2011029051 | 2/2011 |
| JP | 2012131835 A | 7/2012 |
| KR | 20110033772 A | 3/2011 |
| WO | 9209550 | 6/1992 |
| WO | 9708122 | 3/1997 |
| WO | 0050372 A1 | 8/2000 |
| WO | 0055249 A1 | 9/2000 |
| WO | 0059853 A1 | 10/2000 |
| WO | 2008100165 A1 | 8/2008 |
| WO | 2011082204 | 7/2011 |
| WO | 2011134674 | 11/2011 |
| WO | 2012065292 | 5/2012 |
| WO | 2012150559 | 11/2012 |
| WO | 2012150560 | 11/2012 |
| WO | 2013021332 | 2/2013 |
| WO | 2013061274 | 5/2013 |
| WO | 2013173615 | 11/2013 |

OTHER PUBLICATIONS

Ishihara Sangyo KK (Titanium Dioxide Products: WHITE Pigments, Ishihara Sangyo KK, 2012, 7 pages).*

DE 19503470 A1; Date of Publication Aug. 8, 1996; 2 pages; English Abstract.

Nowakowska et al.; "Studies of Some Impurities in Commercial Bisphenols-A"; Polish Journal of Applied Chemistry; Panstwowy Zaklad Wydawnictw Lekarskich; 1996; 9 pages.

International Search Report for International Application No. PCT/US2013/035456; International Filing Date Apr. 5, 2013; Date of Mailing Jun. 27, 2013; 5 pages.

Written Opinion of the International Search Report for International Application No. PCT/US2013/035456; International Filing Date Apr. 5, 2013; Date of Mailing Jun. 27, 2013; 8 pages.

Yamada et al.; Sequential-color LCD based on OCB with an LED backlight; Journal of the SID; 10/1; 2002; 5 pages.

Japanese Patent No. 2012131835 (A); Publication Date: Jul. 12, 2012; Machine Translation from the Japanese Patent Office; 13 Pages.

DuPont T-Pure—Titanium Dioxide; Polymers, Light and the Science of TiO2; Copyright 2007; 20 Pages.

Cytec; Cyasorb UV-5411 Product Safety Summary; Cytec; Dec. 2012; pp. 1-5.

Anderson et al.; "Quantitative Analysis of Commercial Bisphenol A by Paper Chromatography"; Analytical Chemistry; vol. 31, No. 7; 1959; p. 1214-1217.

Anonymous, "Polycarbonate preparation with a low yellowness index," Research Disclosure, Mason Publications, Hampshire GB vol. 449, No. 49 (Sep. 1, 2001) ISSN: 0374-4353 pp. 1-3.

Brunelle, D.J.: "Polycarbonates", Encyclopedia of Polymer Science and Technology, Jan. 1, 2006, pp. I.1-I.33, XP002525090, DOI: 10.1002/0471440264PST255.PUB2, Retrieved from the Internet: URL: http://mrw.interscience.wiley.com/emrw/9780471440260/epst/article/p.

Brydia; "Determination of Bisphenol A and Impurities by Gas Chromatography of Their Trimethylsilyl Ether Derivatives" Analytical Chemistry; vol. 40, No. 14; 1968; pp. 2212-2215.

Chan et al., "Facile Quantitative Analysis of Hydroxyl End Groups of Poly (2,6-dimethyl-1,4-phenylene oxide)s by 31P NMR Spectroscopy", Macromolecules (1994), vol. 27, pp. 6371-6375.

Chinese Patent No. 101205358 (A); Publication Date: Jun. 25, 2008; Abstract Only; 1 Page.

Chinese Patent No. 101885907 (A); Publication Date: Nov. 17, 2010; Abstract Only; 1 Page.

Chinese Patent No. 102134383 (A); Publication Date: Jul. 27, 2011; Abstract Only; 1 Page.

Chinese Patent No. 202091807 (U); Publication Date: Dec. 28, 2011; Abstract Only; 1 Page.

Chou et al.; "The Optimum Conditions for Solid-State-Prepared (Y3-xCex)Al5O12 Phosphor Using the Taguchi Method"; Advanced Powder Technology; vol. 12; 2012; pp. 97-103.

De Brouwer et al.; "Lexan* Polycarbonate for Optical Applications"; SABIC Innovative Plastics; 5 Pages.

English Abstract of JP08038910(A); Date of Publication: Feb. 13, 1996; 1 Page.

English Abstract of JP08071433(A); Date of Publication: Mar. 19, 1996; 1 Page.

English Abstract of JP08325185(A); Date of Publication: Dec. 10, 1996; 2 Pages.

English Abstract of JP10211434(A); Date of Publication: Aug. 11, 1998; 2 Pages.

English Abstract of JP10251180(A); Date of Publication: Sep. 22, 1998; 1 Page.

English Abstract of JP10314595(A); Date of Publication: Dec. 2, 1998; 2 Pages.

English Abstract of JP10328573(A); Date of Publication: Dec. 15, 1998; 1 Page.

(56) References Cited

OTHER PUBLICATIONS

English Abstract of JP11179210(A); Date of Publication: Jul. 6, 1999; 2 Pages.
English Abstract of JP11246458(A); Date of Publication: Sep. 14, 1999; 1 Page.
English Abstract of JP11255748(A); Date of Publication: Sep. 21, 1999; 1 Page.
English Abstract of JP2000281607(A); Date of Publication: Oct. 10, 2000; 1 Page.
English Abstract of JP2000281608(A); Date of Publication: Oct. 10, 2000; 1 Page.
English Abstract of JP2000319216(A); Date of Publication: Nov. 21, 2000; 1 Page.
English Abstract of JP2001233812(A); Date of Publication: Aug. 28, 2001; 1 Page.
English Abstract of JP5271132(A); Date of Publication: Oct. 19, 1993; 2 Pages.
English Abstract of JP5294875(A); Date of Publication: Nov. 9, 1993; 2 Pages.
English Abstract of JP5294876(A); Date of Publication: Nov. 9, 1993; 1 Page.
Factor et al.; "The Use of 31P NMR to Identify Color Bodies in y-irradiated Bisphenol-A Polycarbonate"; Polymer Degradation and Stability; vol. 57; 1997; pp. 83-86.
Factor; "Search for the Sources of Color in Thermally Aged, Weathered and y-Ray Irradiated Bisphenol A Polycarbonate"; Die Angewandte Makromolekulare Chemie; vol. 232; 1995; pp. 27-43.
Godinez et al.; "Experimental Study of the Influence of Raw Material Impurities on Yellowness Index of Transesterification Polycarbonate"; Journal of Applied Polymer Science; vol. 119; 2011; pp. 1348-1356.
Japanese Patent No. 2004149623 (A); Publication Date: May 27, 2004; Abstract Only; 1 Page.
Japanese Patent No. 2004231935 (A); Publication Date: Aug. 19, 2004; Abstract Only; 1 Page.
Japanese Patent No. 2005037591 (A); Publication Date: Feb. 10, 2005; Abstract Only; 2 Pages.
Japanese Patent No. 2005048154 (A); Publication Date: Feb. 24, 2005; Abstract Only; 1 Page.
Japanese Patent No. 2005082713 (A); Publication Date: Mar. 31, 2005; Abstract Only; 2 Pages.
Japanese Patent No. 2005115051 (A); Publication Date: Apr. 28, 2005; Abstract Only; 1 Page.
Japanese Patent No. 2006339033 (A); Publication Date: Dec. 14, 2006; Abstract Only; 2 Pages.
Japanese Patent No. 2008184482 (A); Publication Date: Aug. 14, 2008; Abstract Only; 1 Page.
Japanese Patent No. 2011029051 (A); Publication Date: Feb. 10, 2011; Abstract Only; 2 Pages.
Li et al.; "Design of Mechanically Robust High-Tg Polymers: Synthesis and Dynamic Machanical Relaxation Behavior of Glassy Poly(ester carbonate)s with Cyclohexylene Rings in the Backbone"; Macromolecules; vol. 36; 2003; pp. 9411-9420.
Liptak et al.; "Absolute pKa Determination for Substituted Phenols"; J. Am. Chem. Soc.; vol. 124; 2002; pp. 6421-6427.
Machine Translation of CN1853118(A); Date of Publication: Oct. 25, 2006; 48 Pages.
Machine Translation of FR2685221(A1); Date of Publication: Jun. 25, 1993; 26 Pages.
Machine Translation of FR2685323(A1); Date of Publication: Jun. 25, 1993; 26 Pages.
Machine Translation of JP08319248(A); Date of Publication: Dec. 3, 1996; 8 Pages.
Poskrobko et al.; "High-Performance Liquid Chromatography wtih Multi-Wavelength Detection of the Bisphenol A Impurities"; Journal of Chromatography A; vol. 883; 2000; pp. 291-297.

\* cited by examiner

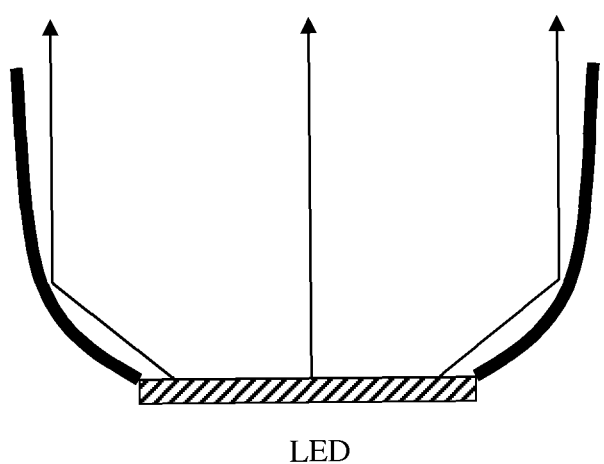
LED

HIGH REFLECTANCE POLYCARBONATE

BACKGROUND

Due to changes in regulations mandating more efficient lighting and the planned phase-out of incandescent bulbs by many countries, new light sources like compact fluorescent lamps (CFLs) and light emitting diodes (LEDs) are becoming increasingly popular with consumers. Not only are these light sources more efficient, but the expected lifetime is also higher, where incandescent bulbs can have a lifetime of up to 1,500 hours (h), CFLs up to 15,000 hours, and LEDs up to 50,000 hours.

Reflectors can be used in lighting components to mix and diffuse light emitted from a light source and reflect it back towards the desired environment. This approach reduces glare and provides better aesthetics as compared to light that is directly emitted from shallowly recessed lights. Reflectors can be made of metal with a high reflectivity and low gloss for better mixing of light.

Due to their mechanical properties, thermoplastic compositions (e.g., polycarbonates) are desirable for use as reflectors, but are inherently not very reflective. Thus, there remains a need in the art for thermoplastic compositions with improved light reflectivity.

SUMMARY

Disclosed herein are polycarbonate compositions, articles comprising the same, and methods of using the same.

In an embodiment, a reflector comprises a polycarbonate composition, the polycarbonate composition comprises: polycarbonate; 10 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm. A molded article of the polycarbonate has transmission level greater than or equal to 90.0% at 2.5 mm thickness as measured by ASTM D1003-00 and a yellow index (YI) less than or equal to 1.5 as measured by ASTM D1925.

In an embodiment, reflector comprises a polycarbonate composition, the polycarbonate composition comprises: a polycarbonate; 10 to 20 wt % titanium dioxide; a flame retardant; and an optional UV stabilizer. The polycarbonate composition has a maximum reflectance of greater than or equal to 95%. The melt volume rate as determined at 300° C. using a 1.2 kilogram weight, in accordance with ASTM D1238-04 is from 5 to 30 grams per 10 minutes. The composition achieves a p(FTP) of greater than or equal to 85% when in the form of a 1.5 mm plaque. A molded article of the polycarbonate has transmission level greater than or equal to 90.0% at 2.5 mm thickness as measured by ASTM D1003-00 and a yellow index (YI) less than or equal to 1.5 as measured by ASTM D1925.

An illumination device, comprising a means for illuminating; a means for power to the means for illuminating; and a reflector comprising a polycarbonate composition, where the polycarbonate composition comprises: polycarbonate; 10 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm. A molded article of the polycarbonate has transmission level greater than or equal to 90.0% at 2.5 mm thickness as measured by ASTM D1003-00 and a yellow index (YI) less than or equal to 1.5 as measured by ASTM D1925.

A method of reflecting light comprising illuminating a reflective surface of a reflector with light from a light source. The reflector comprising a polycarbonate composition, where the polycarbonate composition comprises: polycarbonate; 10 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm. A molded article of the polycarbonate has transmission level greater than or equal to 90.0% at 2.5 mm thickness as measured by ASTM D1003-00 and a yellow index (YI) less than or equal to 1.5 as measured by ASTM D1925.

These and other non-limiting characteristics are more particularly described below.

BRIEF DESCRIPTION OF THE DRAWING

Reference is now made to the following description taken in conjunction with the accompanying FIGURE, which IS exemplary, not limiting.

FIG. 1 is an illustration of a troffer; e.g., a reflector for use with a light emitting element such as an LED.

DETAILED DESCRIPTION

This disclosure focuses on high reflectance thermoplastic articles, e.g., that have an initial reflectivity of greater than or equal to 95% without a metallization layer. It was unexpectedly discovered that such high reflectance could be achieved by incorporating a reflective agent, such as titanium dioxide, into a thermoplastic composition in an amount of 7 to 20 weight percent (wt %) and it was unexpectedly discovered that 20 wt % or more of the reflective agent resulted in a decrease in the reflectivity of the compositions.

For example, the thermoplastic composition can comprise a polycarbonate with a transmission level of greater than or equal to 90.0%, specifically greater than or equal to 94.5% when in the form of a plaque at 2.5 millimeter (mm) thickness. The thermoplastic composition can have a Yellowness Index (YI) of less than 7 after 5,000 h of heat aging 130 degrees Celsius (° C.), specifically, less than 1.5, with an increase in YI of less than 2 after 2,000 h of heat aging at 130° C. YI is measured in accordance with ASTM D1925 Transmission is measured in accordance with ASTM D-1003-00, Procedure A, measured, e.g., using a HAZE-GUARD DUAL from BYK-Gardner, using and integrating sphere (0°/diffuse geometry), wherein the spectral sensitivity conforms to the International Commission on Illumination (CIE) standard spectral value under standard lamp D65.

Polycarbonate

The polycarbonate with said enhanced optical properties can be achieved by, for example, in an interfacial process. Although the reaction conditions for interfacial polymerization can vary, an exemplary process generally involves dissolving or dispersing a dihydric phenol reactant in an aqueous base, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The water immiscible solvent can include one or more of methylene chloride, 1,2-dichloroethane, chlorobenzene, toluene, and the like. Generally, a chelant, such as an iron scavenger, can be used as well to remove impurities and contaminants.

The dihydric phenol reactant can be of very high purity and very low color, e.g., it can be at least 99.80% pure.

A common polymerization process uses bisphenol-A (BPA) for the dihydric phenol reactant, aqueous sodium hydroxide (NaOH), and phosgene as the carbonate precursor.

BPA can be produced in two grades, polycarbonate grade and epoxy grade. Polycarbonate grade BPA is higher purity and has a lower color, as measured by APHA at 325 nm. Generally, high purity BPA has a measured APHA of less than 10 while lower purity, epoxy grade BPA has an APHA of greater than 40.

BPA can be produced by the condensation of phenol with acetone. Phenol can be used in excess, and many other impurities can be formed in the condensation reaction, such as the ortho,para isomer of BPA, other oligomers, and tar. The p,p-isomer can be distilled, and the excess phenol with byproducts can be recycled. Because the excess phenol can be recycled, the impurities can make their way into the BPA being produced. However, some commercial producers of BPA who make both epoxy grade BPA and polycarbonate grade BPA use only fresh inputs can be used for a production line producing polycarbonate grade BPA, sending the recycle streams from the polycarbonate grade line can be used in the epoxy grade line.

The BPA used to form the polycarbonate resins of the present disclosure can have a purity of greater than or equal to 99.65%, specifically greater than or equal to 99.80%. The organic purity can be defined as 100 wt % minus the sum of known and unknown impurities detected using ultraviolet (UV) (see HPLC method in Nowakowska et al., Polish J. Appl. Chem., XI(3), 247-254 (1996)). Such high quality bisphenol-A is commercially available. The BPA for polycarbonates can be the para,para isomer of BPA.

The BPA can have a sulfur level of less than or equal to 4 parts per million by weight (ppm), specifically less than or equal to 2 ppm, even more specifically, less than or equal to 1.5 ppm as measured by a commercially available Total Sulfur Analysis based on combustion and coulometric detection.

Methylene chloride can be used to form BPA. The methylene chloride can be purified by steam precipitation to leave contaminants behind. For example, the methylene chloride can contain less than 10 ppm of calcium, less than 1 ppm of iron, less than 0.5% salt, and/or less than 0.1% degraded polymer.

The aqueous base can be aqueous sodium hydroxide (NaOH). NaOH can be used to maintain the reaction pH within a typical range of 9.5 to 10.0, and to neutralize the HCl formed from the reaction of BPA with phosgene (turning the water into brine). NaOH can be made by the electrolysis of sodium chloride. One impurity formed in the electrolysis and present in the NaOH is sodium chlorate ($NaClO_3$). The amount of $NaClO_3$ can be reduced by reacting the NaOH stream with hydrogen using a ruthenium catalyst supported on carbon. However, it is not possible to guarantee that all the $NaClO_3$ present is reacted, so some will always remain in the treated NaOH solution. $NaClO_3$ is an oxidant and has been demonstrated to react with BPA. While the reaction products of $NaClO_3$ with BPA have not been completely characterized, it is believed that the oxidation of the phenol group of BPA causes the formation of quinone structures, which are typically highly colored. It has been demonstrated that producing polycarbonate resin using NaOH with high levels of $NaClO_3$ results in a resin that when molded is high in color and has poor color stability. The NaOH used in the present disclosure can contain less than 10 ppm of $NaClO_3$. Additionally, solid particulates can be removed from the NaOH solution by filtration using 10 micron absolute media.

High quality phosgene can be used in the polymerization of the polycarbonate. Phosgene can be produced by the reaction of carbon monoxide and chlorine. This reaction is typically run with an excess of carbon monoxide, which is inert in the interfacial polymerization. However, small amounts of un-reacted chlorine can be present in the phosgene. Chlorine can react with NaOH in the interfacial polymerization reaction to produce sodium hypochlorite (NaClO) which can react with BPA in a manner similar to $NaClO_3$. The chlorine can also react directly with BPA. Chlorine reaction with BPA can result in chlorination of the polymer backbone. Polycarbonate produced when free chlorine levels in the phosgene are greater than 500 ppm can result in polycarbonate resin that can have greater than 200 ppm bound chlorine atoms. This resin can have increased yellowness and decreased color stability. The level of incorporated chlorine atoms in the polycarbonate resin can be less than 20 ppm when phosgene containing less than 100 ppm free chlorine is used. Thus, it is important to control the amount of chlorine introduced via phosgene.

The reaction of phosgene with BPA to produce the polycarbonate powder can be run with phosgene to ensure complete molecular weight build and minimize the amount of residual, un-reacted BPA monomer. Generally, 8 to 10 mole % excess phosgene is adequate. When less than 8 mole % excess phosgene is used, there is a greater risk of incomplete batch events that result in the polymer having a weight average molecular weight (Mw) that is lower than desired, and a risk of elevated residual monomer. Generally, there can be less than 50 ppm of hydroxyl end groups in the polycarbonate and less than 50 ppm residual BPA monomer in the polycarbonate.

The weight average molecular weight (Mw) of the polycarbonate powder can be controlled by adding a chain stopping or endcapping agent. Exemplary endcapping agents include phenol, para-t-butylphenol, and p-cumyl phenol (PCP). The amount of endcapping agent can be 2.25 to 5.5 mole % and can result in a Mw of 36,000 to 17,000 grams per mole (g/mol) as determined by gel permeation chromatography (GPC) using polycarbonate standards. More commonly, the amount of endcapping agent can be 2.9 to 4.3 mole % and can result in a Mw of 30,000 to 21,000 g/mol. An endcapping agent can be employed in the reaction such that the resultant composition comprising polycarbonate comprises a free hydroxyl level less than or equal to 150 ppm, more specifically of 25 to 150 ppm, even more specifically 30 to 100 ppm.

The post reaction processing of the polycarbonate can be important in producing a low color and color stable polycarbonate resin. The reaction mixture, containing polycarbonate, brine, water immiscible solvent, and impurities, can be considered to be a batch. The batch can be discharged and purified through a series of purifying stages. Each stage can be made up, for example, of one or more liquid-liquid centrifuges.

In a first purifying stage, the brine phase can be separated from the methylene chloride phase that contains dissolved polycarbonate.

In a second purifying stage, the catalyst can be extracted from the methylene chloride phase. This can be done using dilute aqueous hydrochloric acid.

In a third purifying stage, residual ionic species can be removed by washing the methylene chloride phase using high quality water. High quality water has generally been condensed from steam or has been purified using de-ionization, such that few contaminants are present in the water. For example, the conductivity of the high quality water can be less than 10 micro-siemens per centimeter (micro-siemens/cm). As a result, the polycarbonate can have low residual chloride ions. It has been shown that when water containing mineral and metal impurities such as calcium, silicate, iron, sulfate or the like is used, molded parts made from the subsequent polycarbonate resin can have increased haze and yellowness.

After purification, the non-aqueous phase containing the dissolved polycarbonate can be optionally filtered using 10 micrometer absolute filters. The polycarbonate can then be concentrated and isolated by means of steam precipitation, which instantly flashes the dichloromethane solvent during direct contact with steam. The steam used for precipitation can be very low in mineral and ion content, preferably with a conductivity value of less than one micro-siemens/cm. Precipitation of resin using steam with high mineral or ion content (greater than 10 micro-siemens/cm) can result in high yellowness and poor melt stability for the polycarbonate resin.

The dichloromethane and steam vapors can be separated from the wet polycarbonate. The dichloromethane and steam vapors can themselves be condensed and separated. The recovered dichloromethane can be high purity by virtue of being flashed, and can be reused in future polymerization of BPA. The recovered water can also be high purity, and can be used in the purifying stages for washing or the extraction of catalyst. The recovered catalyst/water mixture can be reused in future polymerization of BPA.

Residual dichloromethane can be removed from the wet polycarbonate in a plug flow column using counter current steam flow. Residual water can be removed from the wet polycarbonate in a fluid bed dryer using heated air. The resulting polycarbonate powder can then be collected.

To summarize, a number of steps can be taken to produce high quality polycarbonate. High purity BPA that is low color and especially color stable can be used. The NaOH base can be low in sodium chlorate content and can be filtered. The phosgene can be low in non-reacted chlorine content. Conservative reaction conditions that ensure complete polymerization can be used. High purity water should be used during the purifying stages of obtaining the polycarbonate.

Next, the compounding processes that form the polycarbonate resin can be optimized as well.

Initially, the high quality polycarbonate, which has been made can be isolated and segregated to designated silos in the compounding operation. Each silo can be cleaned of any residual powder to ensure there is no cross-contamination. The transfer lines used to move polycarbonate powder from the silos to the extrusion line can also be cleaned out prior to transferring. Filtered air can be used for transferring. Any additives (colorants, stabilizers, etc.) can be metered directly into the extruder using dedicated feeders.

The compounding of the polycarbonate powder can be performed in an extruder. An extruder can be used for compounding, molding, pelletization or forming films, sheets or profiles. Such extruders typically have a heated extrusion barrel and one or two screws revolving within the barrel to compress, melt, and extrude the polycarbonate through an orifice in an extrusion nozzle. The barrel can be divided into several different zones, such as feed, transition, mixing, dispersion, and metering zones.

The polycarbonate, along with additives, can be melt extruded at a controlled temperature. 58 mm or 70 mm extruders can be typically used for high-grade polycarbonate resins. The polycarbonate can be melt filtered through a 30 micrometer filter stack to reduce particulate contamination. It is possible to use a smaller mesh filter (10 micrometer) to further improve the quality of the product. Stainless steel water baths with 0.5 micrometer-filtered water can be used to minimize contamination. Polycarbonate resin exiting the extruder can be pelletized and collected in packaging such as bulk boxes or super sacks. Care can be taken during the extrusion and packaging processes to exclude particulates that can be present in air and water transfer systems.

In this respect, two aspects of the compounding process can be relevant to obtaining the high quality polycarbonate resins of the present disclosure. First, as the melt filter sizes get smaller, shear forces and heat can increase as the polycarbonate passes through the filter channels. This can result in an increase in yellowness in the resulting polycarbonate.

Second, an amount of blue colorant can be added to the polycarbonate to offset any yellowness. Once the extruder has reached stable operating state and pellets are being produced, a small sample of pellets can be molded into a color plaque at a specified thickness. Color measurements can be recorded and compared to the desired specifications of the product. The amount of colorant or their strength can then be adjusted to bring the polycarbonate product within specifications. Again, by controlling the yellowness of the polycarbonate, the amount of colorant needed to meet the colorant specification (b*) can be reduced, which increases the brightness (L*).

To obtain the high quality polycarbonate of the present disclosure having increased light transmission and cleanliness, the feed rate to the extruder, the torque of the extruder, the set point for the colorant, and the temperature of the extruder can be optimized. This can be done using a feedback loop to obtain the desired product. The colorant is typically measured as a percentage of the line rate. The torque can be 70% to 90%.

A "polycarbonate" means compositions having repeating structural carbonate units of formula (1)

(1)

in which at least 60% of the total number of $R^1$ groups contain aromatic moieties and the balance thereof are aliphatic, alicyclic, or aromatic.

The polycarbonate can be derived from bisphenol-A.

Each $R^1$ group can be a divalent aromatic group, for example derived from an aromatic dihydroxy compound of the formula (3)

(3)

wherein each of $A^1$ and $A^2$ is a monocyclic divalent arylene group, and $Y^1$ is a single bond or a bridging group having one or two atoms that separate $A^1$ from $A^2$. When each of $A^1$ and $A^2$ is phenylene, $Y^1$ can be para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene. In an embodiment, one atom separates $A^1$ from $A^2$.

Included within the scope of formula (3) are bisphenol compounds of general formula (4)

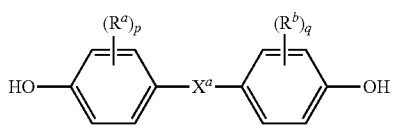

(4)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5) or (6)

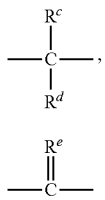

(5)

(6)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. $R^c$ and $R^d$ can each be the same hydrogen or $C_{1-4}$ alkyl group, specifically the same $C_{1-3}$ alkyl group, even more specifically, methyl.

$R^c$ and $R^d$ can be taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

$X^a$ can be a substituted $C_{3-18}$ cycloalkylidene of the formula (7)

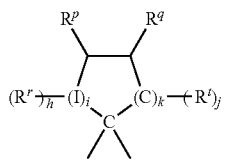

(7)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (7) will have an unsaturated carbon-carbon linkage where the ring is fused. When k is 1 and i is 0, the ring as shown in formula (7) contains 4 carbon atoms, when k is 2, the ring as shown contains 5 carbon atoms, and when k is 3, the ring contains 6 carbon atoms. Two adjacent groups (e.g., $R^q$ and $R^t$ taken together) can be taken together to form an aromatic group. Further, multiple groups can be taken together to form greater than one aromatic groups (e.g. $R^q$ and $R^t$ taken together form one aromatic group and $R^r$ and $R^p$ taken together form a second aromatic group).

When k is 3 and i is 0, bisphenols containing substituted or unsubstituted cyclohexane units are used, for example bisphenols of formula (8)

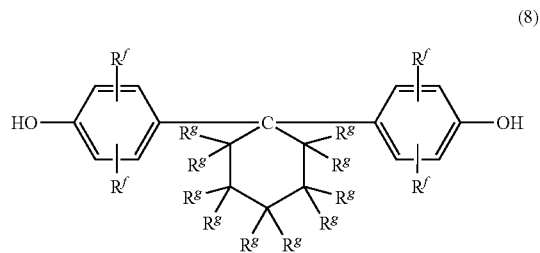

(8)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC* trade name.

Other possible dihydroxy compounds having the formula HO—$R^1$—OH include aromatic dihydroxy compounds of formula (9)

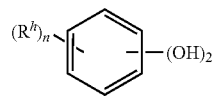

(9)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen can be bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3- bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units. The polycarbonate can be a linear homopolymer or copolymer comprising units derived from bisphenol-A, in which each of $A^1$ and $A^2$ is p-phenylene and $Y^1$ is isopropylidene in formula (3). More specifically, at least 60%, more specifically, at least 80% of the $R^1$ groups in the polycarbonate can be derived from bisphenol-A.

Another specific type of copolymer is a polyester carbonate, also known as a polyester-polycarbonate. Such copolymers further contain, in addition to recurring carbonate chain units of the formula (1), repeating units of formula (10)

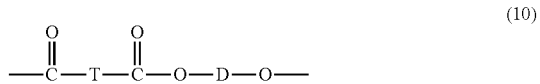

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

D can be a $C_{2-30}$ alkylene group having a straight chain, branched chain, or cyclic (including polycyclic) structure. D can be derived from an aromatic dihydroxy compound of formula (4) above and/or D can be derived from an aromatic dihydroxy compound of formula (9) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. D can be a $C_{2-6}$ alkylene group and T can be p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

The polyester unit of a polyester-polycarbonate can be derived from the reaction of a combination of isophthalic and terephthalic diacids (or derivatives thereof) with resorcinol. The polyester unit of a polyester-polycarbonate can be derived from the reaction of a combination of isophthalic acid and terephthalic acid with bisphenol-A. The polycarbonate units can be derived from bisphenol-A. The polycarbonate units can be derived from resorcinol and bisphenol-A in a molar ratio of resorcinol carbonate units to bisphenol-A carbonate units of 1:99 to 99:1.

A specific example of a polycarbonate-polyester is a copolycarbonate-polyester-polysiloxane terpolymer comprising carbonate units of formula (1), ester units of formula (10), and polysiloxane (also referred to herein as "polydiorganosiloxane") units of formula (11)

wherein each occurrence of R is same or different, and is a $C_{1-13}$ monovalent organic group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. Combinations of the foregoing R groups can be used in the same copolymer. In an embodiment, the polysiloxane comprises R groups that have a minimum hydrocarbon content. An R group with a minimum hydrocarbon content can be a methyl group.

The value of E in formula (11) can vary widely depending on the type and relative amount of each component in the thermoplastic composition, the desired properties of the composition, and like considerations. Herein, E can have an average value of 4 to 50. E can have an average value of 16 to 50, specifically 20 to 45, and more specifically 25 to 45. E can have an average value of 4 to 15, specifically 5 to 15, more specifically 6 to 15, and still more specifically 7 to 12.

stituted with non-aromatic hydrocarbon-containing substituents such as, for example, alkyl, alkoxy, or alkylene substituents.

When Ar is derived from resorcinol, the polydiorganosiloxane repeating units can be derived from dihydroxy aromatic compounds of formula (13)

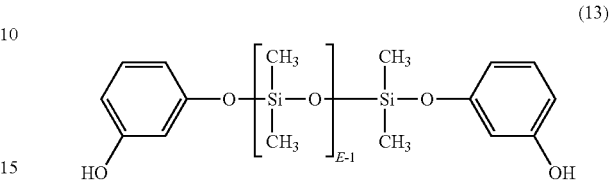

or, when Ar is derived from bisphenol-A, the polydiorganosiloxane repeating units can be derived from dihydroxy aromatic compounds of formula (14)

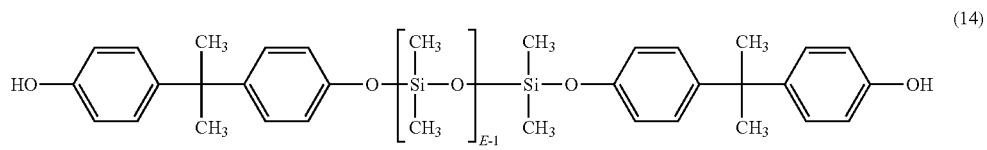

wherein E is as defined above.

Polydiorganosiloxane units can be derived from dihydroxy aromatic compound of formula (15)

Polydiorganosiloxane units can be derived from dihydroxy aromatic compound of formula (12)

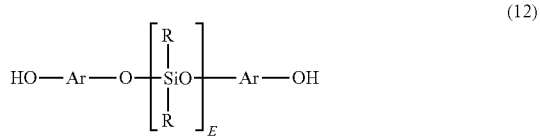

wherein E is as defined above; each R can independently be the same or different, and is as defined above; and each Ar can independently be the same or different, and is a substituted or unsubstituted $C_{6-30}$ arylene group, wherein the bonds are directly connected to an aromatic moiety. Exemplary Ar groups in formula (12) can be derived from a $C_{6-30}$ dihydroxy aromatic compound, for example a dihydroxy aromatic compound of formula (3), (4), (8), or (9) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl) propane. Combinations comprising at least one of the foregoing dihydroxy compounds can also be used. The dihydroxy aromatic compound can be unsubstituted, or not sub-

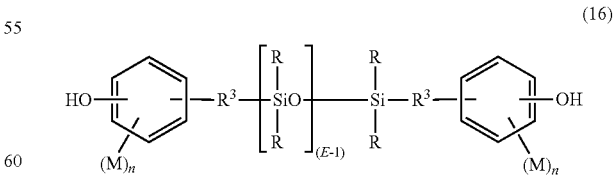

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. When $R^2$ is $C_{7-30}$ arylene-alkylene, the polydiorganosiloxane units can be derived from dihydroxy aromatic compound of formula (16)

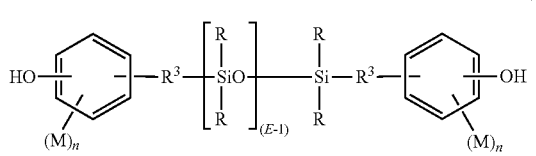

wherein R and E are as defined above. Each $R^3$ is independently a divalent $C_{2-8}$ aliphatic group. Each M can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

M can be bromo or chloro, an alkyl group such as methyl, ethyl, or propyl, an alkoxy group such as methoxy, ethoxy, or propoxy, or an aryl group such as phenyl, chlorophenyl, or tolyl; $R^3$ can be a dimethylene, trimethylene or tetramethylene group; and R can be a $C_{1-8}$ alkyl, haloalkyl such as trifluoropropyl, cyanoalkyl, or aryl such as phenyl, chlorophenyl or tolyl. R can be methyl, or a combination of methyl and trifluoropropyl, or a combination of methyl and phenyl. M can be methoxy, n can be 0 or 1, $R^3$ can be a divalent $C_{1-3}$ aliphatic group, and R can be methyl.

The polydiorganosiloxane units can be derived from a dihydroxy aromatic compound of formula (17)

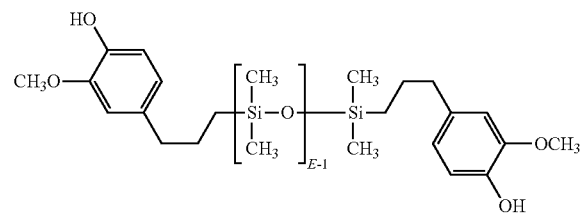

(17)

wherein E is as described above.

The polydiorganosiloxane units can be derived from dihydroxy aromatic compound of formula (18)

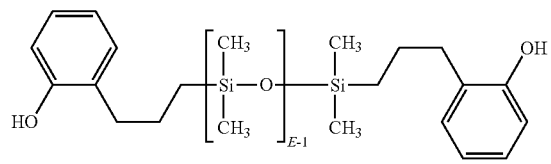

(18)

wherein E is as defined above.

Dihydroxy polysiloxanes typically can be made by functionalizing a substituted siloxane oligomer of formula (19)

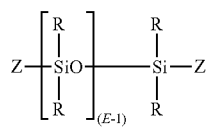

(19)

wherein R and E are as previously defined, and Z is H, halogen (e.g., Cl, Br, I), or carboxylate. Exemplary carboxylates include acetate, formate, benzoate, and the like. In an exemplary embodiment, where Z is H, compounds of formula (19) can be prepared by platinum catalyzed addition with an aliphatically unsaturated monohydric phenol. Exemplary aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing can also be used. Where Z is halogen or carboxylate, functionalization can be accomplished by reaction with a dihydroxy aromatic compound of formulas (3), (4), (8), (9), or a combination comprising at least one of the foregoing dihydroxy aromatic compounds. Compounds of formula (12) can be formed from an alpha, omega-bisacetoxypolydiorangonosiloxane and a dihydroxy aromatic compound under phase transfer conditions.

Specific copolycarbonate terpolymers include those with polycarbonate units of formula (1) wherein $R^1$ is a $C_{6-30}$ arylene group, polysiloxane units derived from siloxane diols of formula (14), (17) or (18), and polyester units wherein T is a $C_{6-30}$ arylene group. T can be derived from isophthalic and/or terephthalic acid, or reactive chemical equivalents thereof. $R^1$ can be derived from the carbonate reaction product of a resorcinol of formula (9), or a combination of a resorcinol of formula (9) and a bisphenol of formula (4).

The relative amount of each type of unit in the foregoing terpolymer will depend on the desired properties of the terpolymer, and are readily determined by one of ordinary skill in the art without undue experimentation, using the guidelines provided herein. For example, the polycarbonate-polyester-polysiloxane terpolymer can comprise siloxane units in an amount of 0.1 to 25 weight percent, specifically 0.2 to 10 wt %, more specifically 0.2 to 6 wt %, even more specifically 0.2 to 5 wt %, and still more specifically 0.25 to 2 wt %, based on the total weight of the polycarbonate-polyester-polysiloxane terpolymer, with the proviso that the siloxane units are provided by polysiloxane units covalently bonded in the polymer backbone of the polycarbonate-polyester-polysiloxane terpolymer. The polycarbonate-polyester-polysiloxane terpolymer can further comprise 0.1 to 49.85 wt % carbonate units, 50 to 99.7 wt % ester units, and 0.2 to 6 wt % polysiloxane units, based on the total weight of the polysiloxane units, ester units, and carbonate units. Alternatively, the polycarbonate-polyester-polysiloxane terpolymer comprises 0.25 to 2 wt % polysiloxane units, 60 to 96.75 wt % ester units, and 3.25 to 39.75 wt % carbonate units, based on the total weight of the polysiloxane units, ester units, and carbonate units.

Various types of thermoplastic compositions are encompassed by embodiments encompassed by this disclosure.

The polycarbonate can be at least one of the following: a homopolycarbonate derived from a bisphenol; a copolycarbonate derived from more than one bisphenol; and a copolymer derived from one or more bisphenols and having one or more aliphatic ester units or aromatic ester units or siloxane units.

In addition to the endcapped polycarbonates described above, the thermoplastic compositions can also comprise other thermoplastic polymers, for example polyesters, polyamides, and other polycarbonate homopolymers and copolymers, including polycarbonate-polysiloxane copolymers and polyester carbonates, also known as a polyester-polycarbonates, and polyesters. The polymer component of such compositions can comprise 1 to 99 wt %, specifically 10 to 90, more specifically 20 to 80 wt % of the cyanophenyl endcapped polycarbonate, with the remainder of the polymer component being other polymers.

A second polycarbonate can be formulated with the composition, wherein a second polycarbonate comprises a repeating structure of formula (20)

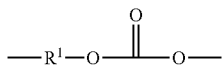

(20)

wherein said second polycarbonate is different from said polycarbonate and wherein at least 60 percent of the total number of $R^1$ groups contain aromatic organic groups and the balance thereof are aliphatic, alicyclic, or aromatic groups.

The second polycarbonate can be derived from bisphenol-A.

The polycarbonates according to embodiments can contain branched polycarbonate(s). Various types of branching agents can be utilized for embodiments encompassed by this disclosure.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A particular type of branching agent can be used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer can become very high upon addition of the branching agent and can lead to viscosity problems during phosgenation. Therefore, an increase in the amount of the chain termination agent can be used in the polymerization. The amount of chain termination agent used when the particular branching agent is used is generally higher than if only a chain termination agent alone is used. The amount of chain termination agent used is generally above 5 mole percent and less than 20 mole percent compared to the bisphenol monomer.

The branching agent can be a structure derived from a triacid trichloride of the formula (21)

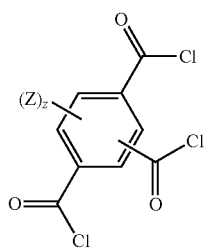

(21)

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (22)

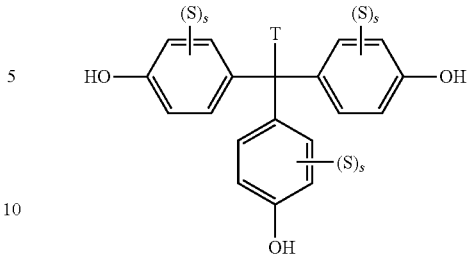

(22)

wherein T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (23)

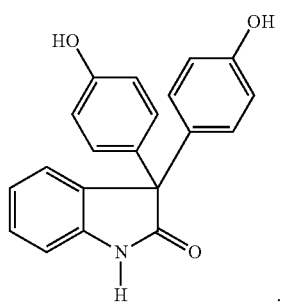

(23)

Examples of specific branching agents that are particularly effective in embodiments include trimellitic trichloride (TMTC), tris-p-hydroxy phenyl ethane (THPE) and isatin-bis-phenol. In formula (21), Z can be hydrogen and z can be 3. In formula (22), S can be hydrogen, T can be methyl, and s can be 4.

The relative amount of branching agents used in the manufacture of a polymer according to embodiments will depend on a number of considerations, for example the type of $R^1$ groups, the amount of cyanophenol, and the desired molecular weight of the polycarbonate. In general, the amount of branching agent is effective to provide 0.1 to 10 branching units per 100 $R^1$ units, specifically 0.5 to 8 branching units per 100 $R^1$ units, and more specifically 0.75 to 5 branching units per 100 $R^1$ units. For branching agents having formula (21), the amount of branching agent tri-ester groups are present in an amount of 0.1 to 10 branching units per 100 $R^1$ units, specifically 0.5 to 8 branching units per 100 $R^1$ units, and more specifically 0.75 to 5 tri-ester units per 100 $R^1$ units. For branching agents having formula (22), the amount of branching agent tricarbonate groups are present in an amount of 0.1 to 10 branching units per 100 $R^1$ units, specifically 0.5 to 8 branching units per 100 $R^1$ units, and more specifically 0.75 to 5 tri-phenylcarbonate units per 100 $R^1$ units. In some embodiments, a combination of two or more branching agents can be used.

In one embodiment, the polycarbonate of a composition has a branching level of greater than or equal to 1%, or greater than or equal to 2%, or greater than or equal to 3%, or 1% to 3%.

Various types of end-capping agents can be utilized for embodiments encompassed by this disclosure.

The end-capping agent can be selected based upon the molecular weight of said polycarbonate and said branching level imparted by said branching agent.

The end-capping agents can be selected from at least one of the following: phenol or a phenol containing one or more substitutions with at least one of the following: aliphatic groups, olefinic groups, aromatic groups, halogens, ester groups, and ether groups.

The end-capping agents can be selected from at least one of the following: phenol, para-t-butylphenol or para-cumylphenol.

In accordance with embodiments, polycarbonates having enhanced optical qualities can be manufactured by an interfacial polymerization process. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. An interfacial polymerization reaction to form carbonate linkages uses phosgene as a carbonate precursor, and can be referred to as a phosgenation reaction.

Among the phase transfer catalysts that can be used are catalysts of the formula $(R_3)_4Q+X$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. An effective amount of phase transfer catalyst can be 0.5 to 2 wt % based on the weight of bisphenol in the phosgenation mixture.

The polycarbonate encompassed by this disclosure can be made by an interfacial polymerization process. One of ordinary skill in the art would be able to carry out an interfacial process without undue experimentation.

The polycarbonate encompassed by this disclosure can exclude the utilization of a melt polymerization process to make at least one of said polycarbonates. Protocols can be adjusted so as to obtain a desired product within the scope of the disclosure and this can be done without undue experimentation.

Reflective Agent

The polycarbonate composition comprises reflective agent(s) with a high refractive index, wherein a high refractive index is greater than 1.7. Desirably, the refractive index is greater than or equal to 2. Possible reflective agents include titanium dioxide (such as rutile and anatase), zinc oxide, zinc sulfide, antimony oxide, and combinations comprising at least one of the foregoing.

The reflective agent can be treated with inorganic treatment materials such as one or more of hydrated alumina, silicon dioxide, sodium silicates, sodium aluminates, sodium aluminum silicates, zinc oxide, zirconium oxide, and mica. These treatment materials can act as building blocks in the construction of the reflective (e.g., titanium dioxide) particle and can be selectively precipitated such that they occur close to the surface in the individual particles.

The reflective agent can be uncoated or coated, wherein the coating can be layered with one or more coating layers. Possible coating agents for the reflective agent can include one or more of silane coupling agents (including alkyl alkoxysilane and polyorgano hydrogen siloxane); silicone oil; alkyl hydrogen polysiloxanes; polyorganosiloxanes; alcohols (including trimethylolpropanol); polyols (including trimethylol propane); alkyl phosphates; phosphorylated fatty acids; higher fatty acid ester; acid compounds (such as phosphorus acid, phosphoric acid, carboxylic acid, and carboxylic anhydride); wax; and other coating agents. Specialized coatings such as titanate coupling agents including isopropyl triisostearoyl titanate can be incorporated. The reflective agent can also, or alternatively, have a metal coating such that the reflective agent either bonds with the polycarbonate or has little to no interaction with the polycarbonate. Possible metals include aluminum, titanium, boron, and so forth. Some example as of coatings include silicon dioxide; a metal oxide (such as aluminum oxide); and a metal nitride (such as boron nitride, silicon nitride, and titanium nitride); as well as combinations comprising at least one of the foregoing. Generally, the reflective agent and the coating have different compositions.

For example, the reflective agent can be a coated titanium dioxide. Possible coatings include inorganic (e.g., alumina) and/or organic coatings (polysiloxane), where the inorganic coating can comprise 0 to 5 wt % silica or alumina and the organic coating can comprise 0 to 3 wt % of an hydrophobic organic surfactant. Hence, the reflective agent can be alumina coated titanium dioxide, alumina and polysiloxane coated titanium dioxide, and/or polysiloxane coated titanium dioxide. For example, the reflective agent is a titanium dioxide having an R2 classification pursuant to DIN EN ISO 591, Part 1, that is stabilized with compound(s) of aluminum and/or silicon, and has a titanium dioxide purity of greater than or equal to 96.0%. An example of a titanium dioxide is Kronos 2233, commercially available from Kronos Worldwide, Inc.

The reflective agent can be present in an amount of 7 to 40 wt %, specifically, 7 to 25 wt %, more specifically 10 to 20 wt %, and even more specifically 12.5 to 15 wt %, based upon the total weight of the polycarbonate composition.

The reflective agent, e.g., titanium dioxide, can be coated or uncoated, and can have an average particle size of less than 500 nanometers (nm), specifically, 30 to 500 nm, more specifically, 50 to 500 nm, still more specifically, 170 to 350 nm, yet more specifically, 100 to 250 nm, and even 150 to 200 nm. For example, the reflective agent, e.g., titanium dioxide, can have an average particle size of greater than or equal to 30 nm, specifically, less than or equal to 180 nm, e.g., 30 to 180 nm. The average particle size can be greater than or equal to 170 nm as smaller particles sizes can appear to be more blue, which may result in a lower reflectivity.

Flame Retardants

The thermoplastic composition can further comprise a flame retardant. Possible flame retardants include organic compounds that include phosphorus, bromine, and/or chlorine. Non-brominated and non-chlorinated phosphorus-containing flame retardants are desirable in certain applications for regulatory reasons, for example organic phosphates and organic compounds containing phosphorus-nitrogen bonds.

One type of organic phosphate is an aromatic phosphate of the formula (GO)3P=O, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresylphosphate, isopropylated triphenyl phosphate, and the like.

Di- or polyfunctional aromatic phosphorus-containing compounds are also useful, for example, compounds of the formulas below:

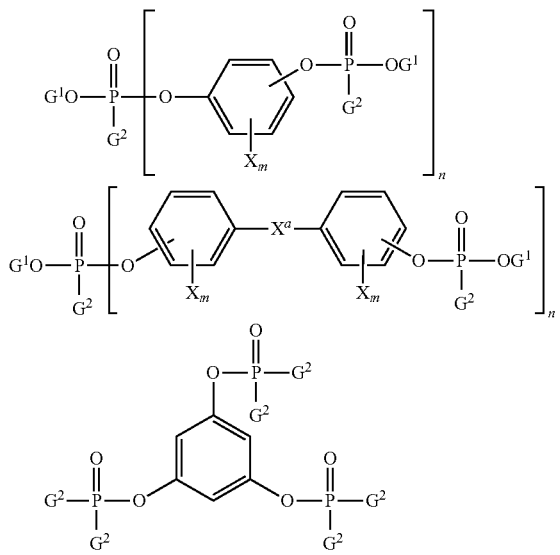

wherein each $G^1$ is independently a $C_{1-30}$ hydrocarbon; each $G^2$ is independently a $C_{1-30}$ hydrocarbon or $C_{1-30}$ hydrocarbonoxy; each X is independently a bromine or chlorine; m is 0 to 4, and n is 1 to 30. Di- or polyfunctional aromatic phosphorus-containing compounds include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of 5 to 30 parts by weight, more specifically 7 to 15 parts by weight, based on 100 parts by weight of polycarbonate and impact modifier.

Halogenated materials can also be used as flame retardants, for example halogenated compounds and resins of formula (27)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (27) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of 0.1 to 10 parts by weight, more specifically 0.5 to 5 parts by weight, based on 100 parts by weight of polycarbonate and impact modifier.

The polycarbonate composition can be essentially free of chlorine and bromine Essentially free of chlorine and bromine refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 ppm by weight, less than or equal to 75 ppm, or less than or equal to 50 ppm. When this definition is applied to the fire retardant, it is based on the total weight of the fire retardant. When this definition is applied to the polycarbonate composition it is based on the total weight of the composition, excluding any filler.

Inorganic flame retardants can also be used, for example salts of $C_{2-16}$ alkyl sulfonate salts such as potassium perfluorobutane sulfonate (salt), potassium perfluoroctane sulfonate, tetraethylammonium perfluorohexane sulfonate, and potassium diphenylsulfone sulfonate (KSS), and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. The flame retardant can comprise p-toluenesulfonic acid sodium salt (NaTS). When present, inorganic flame retardant salts are generally present in amounts of 0.05 to 10 parts by weight, more specifically 0.1 to 5 parts by weight, based on 100 parts by weight of polycarbonate and impact modifier.

Another useful type of flame retardant is a polysiloxane-polycarbonate copolymer having polydiorganosiloxane blocks comprise repeating structural units of formula (28):

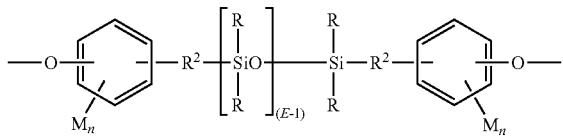

(28)

wherein each R is the same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkyl-aryl group, or $C_7$-$C_{13}$ alkylaryloxy group. Combinations of the foregoing R groups can be used in the same copolymer. $R^2$ in formula (28) is a divalent $C_1$-$C_8$ aliphatic group. Each M in formula (28) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

E in formula (28) is selected so as to provide an effective level of flame retardance to the polycarbonate composition. The value of E will therefore vary depending on the type and relative amount of each component in the polycarbonate composition, including the type and amount of polycarbonate, impact modifier, polysiloxane-polycarbonate copolymer, and other flame retardants. Suitable values for E can be determined by one of ordinary skill in the art without undue experimentation using the guidelines taught herein. Generally, E has an average value of 2 to 1,000, specifically 10 to 100, more specifically 25 to 75. In an embodiment, E has an average value of 40 to 60, and in still another embodiment, E has an average value of 50. Where E is of a lower value, e.g., less than 40, it can be necessary to use a relatively larger amount of the polysiloxane-polycarbonate copolymer. Conversely, where E is of a higher value, e.g., greater than or equal to 40, it can be necessary to use a relatively smaller amount of the polysiloxane-polycarbonate copolymer.

M can be independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

The polysiloxane-polycarbonate copolymer can be manufactured by reaction of the corresponding dihydroxy polysiloxane with a carbonate source and a dihydroxy aromatic compound of formula (3), optionally in the presence of a phase transfer catalyst as described above. Conditions are similar to those useful in forming polycarbonates. Alternatively, the polysiloxane-polycarbonate copolymers can be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising 1 to 60 mole % of polydiorganosiloxane blocks relative to the moles of polycarbonate blocks, and more generally, 3 to 50 mole % of polydiorganosiloxane blocks relative to the moles of polycarbonate blocks. When present, the copolymers can be used in amounts of 5 to 50 parts by weight, more specifically 10 to 40 parts by weight, based on 100 parts by weight of polycarbonate and the impact modifier.

UV Stabilizer

Light stabilizers and/or ultraviolet light (UV) absorbing additives, also referred to as UV stabilizers, can also be used. Light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1, 3,5-triazin-2-yl]-5-(octyloxy)-phenol (CYASORB* 1164); 2,2'-(1,4-phenylene)bis(4H-3,1-benzoxazin-4-one) (CYASORB* UV-3638); poly[(6-morpholino-s-triazine-2,4-diyl)[2,2,6,6-tetramethyl-4-piperidyl)imino]-hexamethylene[(2, 2,6,6-tetramethyl-4-piperidyl)imino], 2-hydroxy-4-octyloxybenzophenone (UVINUL*3008), 6-tert-butyl-2-(5-chloro-2H-benzotriazole-2-yl)-4-methylphenyl (UVINUL*3026), 2,4-di-tert-butyl-6-(5-chloro-2H-benzotriazole-2-yl)-phenol (UVINUL*3027), 2-(2H-benzotriazole-2-yl)-4,6-di-tert-pentylphenol (UVINUL*3028), 2-(2H-benzotriazole-2-yl)-4-(1,1,3,3-tetramethylbutyl)-phenol (UVINUL*3029), 1,3-bis[(2'cyano-3',3'-diphenylacryloyl)oxy]-2,2-bis-{[(2'-cyano-3',3'-diphenylacryloyl)oxy]methyl}-propane (UVINUL*3030), 2-(2H-benzotriazole-2-yl)-4-methylphenol (UVINUL*3033), 2-(2H-benzotriazole-2-yl)-4,6-bis(1-methyl-1-phenyethyl)phenol (UVINUL*3034), ethyl-2-cyano-3,3-diphenylacrylate (UVINUL*3035), (2-ethylhexyl)-2-cyano-3,3-diphenylacrylate (UVINUL*3039), N,N'-bisformyl-N,N'-bis(2,2,6,6-tetramethyl-4-piperidinyl)hexamethylendiamine (UVINUL*4050H), bis-(2,2,6,6-tetramethyl-4-piperidyl)-sebacate (UVINUL*4077H), bis-(1,2,2,6,6-pentamethyl-4-piperidyl)-sebacate+methyl-(1,2,2,6,6-pentamethyl-4-piperidyl)-sebacate (UVINUL*4092H) 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; TINUVIN* 234; nano-size inorganic materials such as titanium oxide, cerium oxide, and zinc oxide, all with particle size less than or equal to 100 nanometers; or the like, or combinations comprising at least one of the foregoing UV absorbers. UV absorbers can be used in amounts of 0.01 to 1 part by weight, based on 100 parts by weight of polycarbonate and impact modifier. UV absorbers that can be particularly useful with the polycarbonate compositions disclosed herein include 2-(2H-benzotriazol-2-yl)-4-(1,1,3,3-tetramethylbutyl)-phenol (e.g., CYASORB* 5411 commercially available from Cytec Industries, Inc., Woodland Park, N.J.) and 2,2'-(1,4-phenylene)bis(4H-3,1-benzoxazin-4-one) (e.g., CYASORB* UV-3638, commercially available from Cytec Industries, Inc., Woodland Park, N.J.), and combinations comprising at least one of the foregoing. The UV stabilizers can be present in an amount of 0.01 to 1 wt %, specifically, 0.1 to 0.5 wt %, and more specifically 0.15 to 0.4 wt %, based upon the total weight of the polycarbonate composition.

Additives

In addition to the polycarbonate, the polycarbonate composition can include various additives (such as impact modifiers, fillers, heat stabilizers, plasticizers, lubricants, mold release agents, anti-drip agents, antistatic agents, colorants, radiation stabilizers, and low gloss additives) ordinarily incorporated into polycarbonate compositions of this type, with the proviso that the additive(s) are selected so as to not significantly adversely affect the desired properties of the polycarbonate composition, in particular the reflectance values. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Co-woven structures include glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants.

Heat stabilizer additives include organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. The heat stabilizer can be tris(2,4-di-t-butylphenyl)phosphate available as IRGAPHOS* 168. Heat stabilizers are generally used in amounts of 0.01 to 5 parts by weight, based on 100 parts by weight of polycarbonate and impact modifier.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents. The antistatic agent can be present in an amount of less than or equal to 3 wt %, specifically, greater than 0 and less than or equal to 3 wt %, more specifically, less than or equal to 1 wt %, even more specifically, less than or equal to 0.75 wt %, based upon a total weight of the polycarbonate composition. For example, the amount of antistatic agent can be 0.01 to 2 wt %, specifically, 0.05 to 1 wt %, based upon a total weight of the polycarbonate composition.

Polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT* 6321 (commercially available from Sanyo) or PEBAX* MH1657 (commercially available from Atofina), IRGASTAT* P18 and P22 (commercially available from Ciba-Geigy). Other polymeric materials that can be used as antistatic agents are inherently conducting polymers such as polyaniline (commercially available as PANIPOL*EB from Panipol), polypyrrole and polythiophene (commercially available from Bayer), which retain some of their intrinsic conductivity after melt processing at elevated temperatures. In an embodiment, carbon fibers, carbon nanofibers, carbon nanotubes, carbon black, or a combination comprising at least one of the foregoing can be used in a polymeric resin containing chemical antistatic agents to render the composition electrostatically dissipative.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. A TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

Radiation stabilizers can also be present, specifically gamma-radiation stabilizers. Gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl alcohol. 2-Methyl-2,4-pentanediol, polyethylene glycol, and polypropylene glycol are often used for gamma-radiation stabilization.

The article formed from the polycarbonate composition can be low gloss, wherein low gloss for plastic gloss units is less than or equal to 20 gloss units. Specifically, the polycarbonate composition has a gloss of less than or equal to 15 gloss units, specifically, less than or equal to 10 gloss units. As used herein, gloss is measured at 60 degrees on 2.5 millimeter thick color chips according to ASTM D2457. The low gloss can also be achieved by texturing on the article, e.g., by texturing the mold to create a pattern on the surface of the plastic, by secondary operations (e.g., sanding) which texture the surface of the article, and/or low gloss additives can be present in the polycarbonate composition.

The low gloss additive can be a gel-type low gloss additive and can comprise the reaction product of a polyepoxide, a polymer comprising an ethylenically unsaturated nitrile, and optionally a polycarbonate. Examples of gel-type low gloss additives include, simple aliphatic diepoxides such as dodecatriene dioxide, dipentene dioxide and 1,2,7,8-diepoxyoctane; bis-glycidyl ethers/esters such as bisglycidyl ether of bisphenol A and its condensation products; alicyclic diepoxides such as 3,4-epoxycyclohexyl-3,4-epoxycyclohexanecarboxylate and bis(3,4-epoxycyclohexylmethyl)adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil, and soybean oil; combinations comprising one or more of the foregoing, and the like.

The low gloss additive can be a multifunctional agent with 3 or more reactive groups wherein at least one reactive group is an epoxy group and a second group can comprise an epoxy group, hydroxyl group, an isocyanate, a silane, a glycidyl methacrylate modified polyolefin, and the like, combinations comprising one or more of the foregoing. Examples of multifunction low gloss agents include molecules such as a tri-methoxy or tri-ethoxy silane also bearing an epoxy group, for example (3,4-epoxycyclohexyl)ethyltriethoxysilane, (3,4-epoxycyclohexyl)ethyltrimethoxysilane, and 3-glycidoxypropyltriethoxysilane. The low gloss additive can be polymer particles, for example, copolymers of mono-vinyl aromatic monomers and multiple-vinyl aromatic monomers, wherein the examples of mono-vinyl monomers include styrene, ethylvinylbenzene, α-methyl-styrene, 1-vinyl naphthalene, 2-vinyl naphthalene, vinyl toluene, methoxystyrene, t-butoxystyrene, alkyl, cycloalkyl, aryl, alkaryl, and aralkyl derivatives.

Optionally, the loss gloss additive can comprise a gel-type low gloss additive. The gel-type low gloss additive comprises the reaction product of a polyepoxide and a polymer comprising an ethylenically unsaturated nitrile, and can further comprise a polycarbonate. The components are reactively combined at elevated temperature to form the gel-type low gloss additive. Examples of gel-type low gloss additives and methods of preparing them are disclosed in U.S. Pat. No. 5,530,062 to Bradtke.

Possible polyepoxides for use in preparing gel-type low gloss additives include simple aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl)adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil and soybean oil; and combinations comprising one or more of the foregoing; and the like. Specifically useful polyepoxides are alicyclic polyepoxides such as 3,4-epoxycyclohexyl 3,4-epoxycyclohexylcarboxylate, available under the trade name ERL-4221 from Union Carbide.

Also employed can be additional polymer(s) containing structural units derived from at least one ethylenically unsaturated nitrile (such as acrylonitrile, methacrylonitrile, and/or fumaronitrile). Acrylonitrile is specifically useful, as are copolymers in which at least some of the other units are derived from a vinyl aromatic compound. Examples of copolymers of this type include styrene-acrylonitrile (SAN) copolymers, α-methylstyrene-acrylonitrile copolymers, acrylonitrile-styrene-methacrylic acid ester terpolymers, acrylonitrile-butadiene-styrene (ABS) resins, acrylonitrile-ethyl acrylate-styrene copolymers and rubber-modified acrylonitrile-styrene-butyl acrylate polymers, as well as combinations comprising at least one of the foregoing.

Styrene-acrylonitrile (SAN) copolymers are particularly useful. SAN copolymers can comprise greater than or equal to 5 wt%, specifically 15 to 35 wt% ethylenically unsaturated nitrile units. More specifically, the SAN copolymer can comprise 75 wt % styrene and 25 wt % acrylonitrile units irrespective of the monomer proportions in the copolymerization mixture, and those are therefore the proportions most often used. The weight average molecular weight (Mw) of the additional polymer, as determined by gel permeation chromatography relative to polystyrene standards, can be 30,000 to 150,000 Daltons.

A polycarbonate as described above can be added to the gel-type low gloss additive. A polycarbonate derived from 2,2-bis(4-hydroxyphenyl)propane, e.g. bisphenol A, can be particularly useful. The weight averaged molecular weight, as determined by gel permeation chromatography relative to polystyrene standards, of a desirable polycarbonate can be 10,000 to 100,000 Daltons.

The polyepoxide and ethylenically unsaturated nitrile containing copolymer (e.g., SAN) can be melt blended to react in a batch or continuous mode. Typically, the polymers are extruded to form the gel-type low gloss additive. An epoxide ring-opening catalyst (e.g., a sulfonic acid such as dodecylbenzenesulfonic acid) can be added to the feed throat of an extruder concurrently with the polyepoxide and ethylenically unsaturated nitrile containing polymer. The polyepoxide can be present in an amount of 1.5 to 6.0 wt %, with the catalyst present in an amount of 800 to 1,800 ppm by weight based upon the amount of ethylenically unsaturated nitrile containing copolymer. Water can also be introduced, e.g., in an amount of 0.05 to 1.0 wt % relative to the amount of ethylenically unsaturated nitrile containing copolymer.

Extrusion of the polymers can be carried out using a twin screw extruder operating at a temperature of 220 to 300° C., and the resulting reaction product is obtained as a gel.

The gel can be melt blended, at a temperature of up to 350° C., with a polycarbonate during preparation of the gel-type low gloss additive to facilitate the production of a strandable product with minimum energy input. The gloss reducing efficiency of the gel is also improved when blended with a polycarbonate to form the gel-type low gloss additive, and therefore less of the gel is needed to produce an equivalent reduction in gloss.

The gel-type low gloss additive can comprise 25 to 75 wt % polycarbonate and 75 to 25 wt % of the gel comprising the co-reacted polyepoxide and ethylenically unsaturated nitrile containing copolymer, based upon a total weight of the gel-type low gloss additive.

Optionally, the polyepoxide and ethylenically unsaturated nitrile containing copolymer can be combined with an initial portion of polycarbonate used to form the gel-type low gloss additive, and fed into the feed throat of an extruder. The remaining portion of the polycarbonate used to form the gel-type low gloss additive can be added using a downstream feed port of the extruder. For example, the first portion of 20 to 60 wt % of the polycarbonate used to form the gel-type low gloss additive can be added to the feed throat of the extruder with the polyepoxide and ethylenically unsaturated nitrile containing polymer, and the second portion comprising 80 to 20 wt % of the polycarbonate used to form the gel-type low gloss additive (i.e., the balance of the polycarbonate used to form the gel-type low gloss additive), can be added to the downstream feed port of the extruder.

Polycarbonate Composition

The thermoplastic composition can comprise 80 to 93 wt % thermoplastic resin (e.g., polycarbonate, polyester, and combinations comprising at least one of the foregoing, e.g., polybutylene terephthalate/polyethylene terephthalate (PBT/PET), polycarbonate/acrylonitrile butadiene styrene (PC/ABS), or ABS) and 7 to 20 wt % of a reflective agent. The polycarbonate composition can comprise 85 to 87.5 wt % polycarbonate and 12.5 to 15 wt % of a reflective agent. The polycarbonate composition can comprise 69 to 93 wt % polycarbonate; 7 to 20 wt % of a reflective agent; 0 to 1 wt % of a UV stabilizer; and 0 to 10 wt % of a flame retardant. The composition can be free of metallization and relies only on the reflective agent to provide the high reflectivity. All of the foregoing wt % values are based on the combined weight of the composition.

Plaques formed from the polycarbonate composition can have a reflectance (also referred to as maximum reflectance) of greater than or equal to 95.0%, specifically, greater than or equal to 96.0%, more specifically, greater than or equal to 96.5%, more specifically, greater than or equal to 97.0%, yet more specifically, greater than or equal to 97.5%, and even greater than or equal to 98.0%, as determined by reflectance measurements using a Gretag Macbeth Coloreye spectrophotometer (D65 light source, 10 degree observer, UV included) made at a wavelength of 680 nm.

The polycarbonate composition can have a melt volume ratio (MVR) of 5 to 50 grams (g) per 10 minutes (min), more specifically 7 to 30 g/10 minutes, even more specifically more specifically 10 to 30 g/10 minutes, measured at 250° C. under a load of 10 kilograms (kg) and/or 260° C. under a load of 2.16 kg and/or 300° C. under a load of 1.2 kg in accordance with ASTM D1238-04.

The polycarbonate composition can have a probability of first time pass of greater than or equal to 85% and more specifically, greater than or equal to 90%.

The polycarbonate composition in the form of a plaque, can achieve a UL94 rating at 1.5 mm of HB, specifically of V2, more specifically, of V0. A rating of 5VA can be attained at a thickness of 3.0 mm, specifically, at 2.5 mm.

The polycarbonate can have excellent color stability, i.e., a 3.2 mm plaque of the composition, exposed to a light emitting diode (LED) light in a light box with 6 LED lights (GE-Tetra LED System 5 Amp max output 20 watts) for 2,000 hours results in a color change of less than or equal to 0.5 Delta E units (DE), specifically, less than or equal to 0.25 DE. DE represents a change in the color parameters L* [difference between light (L*=100) and dark (L*=0) values], a* [difference between green (−a*) and red (+a*)] and b* [difference between yellow (+b*) and blue (−b*)] of a 2.54 millimeter (mm) color chip measured before and after exposure to the LED light system. The color shift can be bluer and the level of reflectance can improve.

Shaped, formed, or molded articles comprising the thermoplastic (e.g., polycarbonate) compositions are also provided. The compositions can be molded into useful shaped articles by a variety of means such as injection molding, extrusion, rotational molding, blow molding and thermoforming. Since the article can be reflective, the composition can be employed in articles where reflectivity is desirable. Optionally, the articles can be without metallization (e.g., without metallization on the reflective surface). Some possible articles include, a substrate, a window, or a housing. The article can be a reflector (also known as an armature or troffer), e.g., a reflector for a switch (such as an illuminating push switch or optoelectronic switch), a display inner frame of a vending machine, a reflector in a back light display unit, a stroboscopic reflector, and the like. The articles can be used as components in lighting applications (indoor lighting, outdoor lighting, vehicle lighting, displays, and so forth), such as head lights, overhead lights, street lights, recessed lights, handheld lights (e.g., flashlights), front and/or rear lights for a vehicle, interior vehicle lights, and so forth. Articles comprising the compositions can be used in vehicular applications (for example in automobiles, watercrafts, trains, and planes); building applications (for example in houses, apartments, office buildings, stores, and tunnels). In the lighting application, the article can form any desired reflective surface, such as a reflector or housing for a light source (e.g., bulb, laser, or LED). For example, the compositions can be used for such application as the reflector in a troffer such as that illustrated in FIG. 1. For example, in a lighting application, an illumination device can comprise a light source, a reflector which is in optical communication with the light source when in use, wherein the reflector comprises the polycarbonate composition (and optionally, wherein the surface of the reflector in optical communication with the light source is free of metallization), and a power element for directing power from a power source to the light source. Optionally, the device can further comprise a heat sink for removing heat, e.g., heat generated by the light source.

Set forth below are some embodiments of the composite, and articles and methods for the same.

Embodiment 1

A polycarbonate composition comprises: polycarbonate; 10 wt % to 20 wt % titanium dioxide, based upon a total weight of the polycarbonate composition; an optional flame retardant; and an optional UV stabilizer. A plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm.

Embodiment 2

A polycarbonate composition comprises: a polycarbonate; 10 to 20 wt % titanium dioxide; a flame retardant; and an optional UV stabilizer; wherein the polycarbonate composition has a maximum reflectance of greater than or equal to 95%. The melt volume rate as determined at 300° C. using a 1.2 kilogram weight, in accordance with ASTM D1238-04 is from 5 to 30 grams per 10 s. When in the form of a 1.5 mm plaque, the composition achieves a p(FTP) of greater than or equal to 85%.

Embodiment 3

The reflector of Embodiment 2, wherein the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm.

Embodiment 4

The reflector of any of Embodiments 1-3, wherein the reflectance is greater than or equal to 96%.

Embodiment 5

The reflector of any of Embodiments 1-4, comprising a melt volume rate as determined at 300° C. using a 1.2-kilogram weight, in accordance with ASTM D1238-04 of 5 to 50 grams per 10 minutes.

Embodiment 6

The reflector of any of Embodiments 1-5, wherein the titanium dioxide is present in an amount of 10 wt % to 15 wt %.

Embodiment 7

The reflector of any of Embodiments 1-6, wherein the titanium dioxide is present in an amount of 12.5 wt % to 15 wt %.

Embodiment 8

The reflector of any of Embodiments 1-7, wherein the titanium dioxide has an average particle size of 30 nm to 500 nm.

Embodiment 9

The reflector of any of Embodiments 1-8, wherein the titanium dioxide comprises coated titanium dioxide, where the titanium dioxide is coated with alumina and/or polysiloxane.

Embodiment 10

The reflector of any of Embodiments 1-9, wherein the titanium dioxide comprises rutile titanium dioxide.

Embodiment 11

The reflector of any of Embodiments 1-10, wherein when exposed to an LED light in a light box with 6 LED lights (GE-Tetra LED System 5 Amp max output 20 watts) for 2,000 hours, a 3.2 mm plaque formed from the composition has a color change of less than or equal to 0.5 DE.

Embodiment 12

The reflector of any of Embodiments 1-11, wherein the composition is able to achieve a UL94 V0 rating at 1.5 mm.

Embodiment 13

The reflector of any of Embodiments 1-12, wherein the composition further comprises potassium diphenylsulfone sulfonate and/or TSAN.

Embodiment 14

The reflector of any of Embodiments 1-13, wherein the reflector is free of a metal coating.

Embodiment 15

The reflector of any of Embodiments 1-14, comprising a reflective surface having a reflectivity of greater than or equal to 95%, and wherein the reflective surface is free of metallization.

Embodiment 16

The reflector of any of Embodiments 1-15, wherein the polycarbonate is polymerized from a BPA with a BPA purity of greater than 99.65 wt % and a sulfur level of less than 2 ppm, and wherein the polycarbonate has a hydroxy level of less than 150 ppm.

Embodiment 17

An illumination device, comprising:
a reflector of any of Embodiments 1-16;
means for illuminating; and
means for providing power to the means for illuminating.

Embodiment 18

A method of reflecting light comprising:
illuminating a reflective surface of a reflector of any of Embodiments 1-16 with light from a light source.

Embodiment 19

An illumination device, comprising: the reflector of any of Embodiments 1-16; means for illuminating; and means for providing power to the means for illuminating.

Embodiment 20

A method of reflecting light comprising: illuminating the reflector of any of Embodiments 1-16 with light from a light source.

Embodiment 21

A method of reflecting light in a troffer comprising: illuminating a reflector of a troffer with light from a light source, wherein the troffer reflector is the reflector of any of Embodiments 1-16.

Embodiment 22

The method of Embodiment 21, wherein the article is a reflector.

Embodiment 23

The method of any of Embodiments 21-22, wherein the article is used in a vehicle.

Embodiment 24

The method of any of Embodiments 21-23, wherein the article has a reflective surface, and wherein the reflective surface is free of metallization.

The polycarbonate compositions are further illustrated by the following non-limiting examples.

EXAMPLES

In the examples, the level of reflectivity of the resin was measured using a Gretag Macbeth Coloreye spectrophotometer (D65 light source, 10 degree observer, UV included). Measurements were made at wavelength intervals of 10 nm from 360 to 750 nm measured on a 3.2 mm thick plaque. Reflectivity values at 680 nm were used to define maximum percent reflectivity for each material formulation.

Melt Volume Rate (MVR) was determined at 300° C. using a 1.2-kilogram weight, in accordance with ASTM D1238-04.

The color of the polycarbonate composition was measured according to the CIELAB color space. The CIELAB color space has three parameters: L*, a*, and b*. L* represents the lightness of the color, where L*=0 is black and L*=100 is white.

In the examples, the level of reflectivity of the resin was measured using a Gretag Macbeth Coloreye spectrophotometer (D65 light source, 10 degree observer, UV included). Measurements were made at wavelength intervals of 10 nm from 360 to 750 nm. Reflectivity values at 680 nm were used to define maximum percent reflectivity for each material formulation.

The following components as used in the examples are described in Table 1.

TABLE 1

| Acronym | Component** | Source |
| --- | --- | --- |
| PC (100 Grade PC) | BPA-Polycarbonate having a weight average MW* of 29,900 daltons | SABIC's Innovative Plastics business |
| PC-M | Improved purity PC# | SABIC's Innovative Plastics business |
| $TiO_2$ | Titanium dioxide coated with organic polysiloxane coating | Kronos |
| UV1 | 2-(2'-hydroxy-5-t-octylphenyl)-benzotriazole | Cytec Industrial Corp. |
| KSS | Potassium diphenylsulfone sulfonate | SLOSS INDUSTRIES CORPORATION |

*as determined by gel permeation chromatography using polycarbonate standards
**wt % are based upon the total weight of the component
PC-M is an improved purity PC polymerized from a BPA with a BPA purity >99.65 wt. % and a sulfur level of less than 2 ppm, and hydroxy levels <150 ppm

Example 1

Compositions of Varying Additive Level

To a polycarbonate powder (either the standard PC-M (Samples A-G as shown in Table 2) or PC (Samples H-N as shown in Table 3)) produced by bisphenol A and phosgene by interfacial condensation polymerization, various additives shown in Tables 2 and 3 were added in respective amounts and blended by a blender and melt-kneaded by use of a vented twin-screw extruder to obtain pellets. After the obtained pellets were dried by a hot air circulation type dryer at 120° C. for 6 hours, test pieces in the form of smooth, flat plates having a length of 75 mm, a width of 50 mm, and a thickness of 25 mm were molded using an injection molding machine at a cylinder temperature of 270° C. to 290° C., a mold temperature of 80° C. to 90° C., and an injection rate of 150 mm/second.

The evaluation of the various samples for melt flow (MF) and their respective color properties is shown in Tables 2 and 3. The reflectance is reported in Tables 2 and 3 as the maximum reflectance recorded (Ref-Max) and the wt % is based upon the total weight of the composition. Table 3 further shows a comparison of the change in b*, the change in Ref-Max after aging, and the YI change after aging between the compositions that comprise PC and the corresponding composition that comprises PC-M.

TABLE 2

| Sample | A | B | C | D | E | F | G |
|---|---|---|---|---|---|---|---|
| $TiO_2$ (wt %) | 10 | 15 | 15 | 10 | 7.5 | 7.5 | 12.5 |
| UV1 (wt %) | 0.0 | 0.0 | 0.4 | 0.2 | 0.0 | 0.4 | 0.3 |
| KSS (Yes (Y) or No (N)) | N | N | N | N | N | N | Y |
| Properties | | | | | | | |
| MF (g/10 min) | 8.1 | 8.0 | 10.0 | 8.8 | 10.4 | 9.6 | 6.0 |
| L | 98.13 | 98.33 | 98.20 | 98.16 | 97.98 | 98.01 | 97.91 |
| a* | −0.48 | −0.50 | −0.62 | −0.55 | −0.49 | −0.57 | −0.46 |
| b* | 2.25 | 2.28 | 2.82 | 2.67 | 2.01 | 2.80 | 2.02 |
| Change in b* at 5000 h | 3.03 | 3.14 | 3.13 | 3.15 | 3.14 | 3.44 | 7.78 |
| Ref-Max (%) | 96.34 | 96.83 | 96.67 | 96.58 | 95.70 | 96.38 | 95.77 |
| Ref-Max (%) at 5000 h | 94.74 | 94.76 | 94.78 | 94.83 | 94.63 | 94.77 | 94.90 |
| Ref-Max change after aging (%) | 1.60 | 2.07 | 1.90 | 1.75 | 1.07 | 1.62 | 0.87 |
| YI | 3.40 | 3.42 | 4.35 | 4.06 | 2.98 | 4.41 | 3.69 |
| YI at 5000 h | 9.35 | 9.61 | 10.70 | 10.35 | 9.09 | 11.37 | 17.65 |
| YI change after aging | 5.95 | 6.19 | 6.35 | 6.29 | 6.11 | 6.97 | 13.96 |

TABLE 3

| Sample | H | I | J | K | L | M | N |
|---|---|---|---|---|---|---|---|
| $TiO_2$ (wt %) | 10 | 15 | 15 | 10 | 7.5 | 7.5 | 12.5 |
| UV1 (wt %) | 0.0 | 0.0 | 0.4 | 0.2 | 0.0 | 0.4 | 0.3 |
| KSS (Yes (Y) or No (N)) | N | N | N | N | N | N | Y |
| Properties | | | | | | | |
| MF (g/10 min) | 9.5 | 9.4 | 10.8 | 9.9 | 8.8 | 10.5 | 6.4 |
| L | 98.12 | 98.22 | 98.30 | 98.22 | 98.09 | 98.12 | 97.94 |
| a* | −0.50 | −0.51 | −0.63 | −0.59 | −0.49 | −0.62 | −0.51 |
| b* | 2.63 | 2.45 | 2.94 | 2.92 | 2.61 | 3.07 | 2.17 |
| Change in b* at 5000 h | 3.78 | 3.62 | 3.87 | 3.54 | 3.83 | 4.06 | 8.44 |
| Ref-Max (%) | 96.50 | 96.64 | 96.65 | 96.50 | 96.14 | 96.31 | 95.83 |
| Ref-Max (%) at 5000 h | 94.21 | 94.29 | 94.28 | 94.30 | 94.26 | 94.07 | 94.56 |
| Ref-Max change after aging (%) | 2.29 | 2.36 | 2.37 | 2.20 | 1.88 | 2.24 | 1.27 |
| YI | 4.07 | 3.77 | 4.50 | 4.46 | 4.07 | 4.90 | 4.01 |
| YI at 5000 h | 11.54 | 10.87 | 12.21 | 11.52 | 11.60 | 13.09 | 19.28 |
| YI change after aging | 7.47 | 7.10 | 7.71 | 7.06 | 7.54 | 8.19 | 15.27 |
| Sample comparison (PC-PC-M) | | | | | | | |
| Samples compared | A-H | B-I | C-J | D-K | E-L | F-M | G-N |
| Change in b* at 5000 h | 0.74 | 0.48 | 0.74 | 0.39 | 0.69 | 0.62 | 0.66 |
| Ref-Max change after aging (%) | 0.69 | 0.28 | 0.48 | 0.45 | 0.81 | 0.62 | 0.40 |
| YI change after aging | 1.52 | 0.91 | 1.36 | 0.76 | 1.42 | 1.23 | 1.31 |

Tables 2 and 3 clearly show that when comparing a standard PC with a PC-M formulation of identical composition, the compositions comprising PC-M result in less change in YI (less yellowing), less change in reflectance (less reflectance loss), and less change in b* (less yellowing).

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The endpoints of all ranges directed to the same component or property are inclusive of the endpoint and independently combinable. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. "Combination" is inclusive of blends, mixtures, alloys, reaction products, and the like. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Alkyl groups can be straight-chained or branched. Throughout the specification, reference is made to various bivalent groups. Such groups are the same as the monovalent groups that are similarly named, and are typically indicated with an "ene" suffix. For example, a $C_1$ to $C_6$ alkylene group is a bivalent linking group having the same structure as a $C_1$ to $C_6$ alkyl group.

Unless otherwise indicated, each of the foregoing groups can be unsubstituted or substituted, provided that the substitution does not significantly adversely affect synthesis, stability, or use of the compound. The term "substituted" as used herein means that any one or more hydrogens on the designated atom or group are replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

We claim:

1. A reflector comprising a polycarbonate composition, wherein the polycarbonate composition comprises:
   a polycarbonate, wherein the polycarbonate is interfacially polymerized from a bisphenol A having an organic purity of greater than 99.65 wt % and a sulfur level of less than 2 ppm; and wherein the polycarbonate has a free hydroxy level of less than 150 ppm;
   10 wt % to 20 wt % titanium dioxide, based upon a total weight of the polycarbonate composition;
   an optional flame retardant; and
   an optional UV stabilizer;
   wherein a plaque formed from the polycarbonate composition has a reflectance of greater than or equal to 95%, as determined by reflectance measurements using a Gretag Macbeth Coloreye spectrophotometer (D65 light source, 10 degree observer, UV included) made at a wavelength of 680 nm;
   wherein a molded article of the polycarbonate has transmission level greater than or equal to 90.0% at 2.5 mm thickness as measured by ASTM D1003-00 and a yellow index (YI) less than or equal to 1.5 as measured by ASTM D1925.

2. The reflector of claim 1, wherein the composition consisting essentially of the polycarbonate, the titanium dioxide, the optional flame retardant; and the optional UV stabilizer the reflectance is greater than or equal to 96%.

3. The reflector of claim 1, wherein the composition has a melt volume rate as determined at 300° C. using a 1.2-kilogram weight, in accordance with ASTM D1238-04 of 5 to 50 grams per 10 minutes.

4. The reflector of claim 1, wherein the titanium dioxide is present in an amount of 10 wt % to 15 wt %.

5. The reflector of claim 1, wherein the titanium dioxide is present in an amount of 12.5 wt % to 15 wt %.

6. The reflector of claim 1, wherein the titanium dioxide has an average particle size of 30 nm to 500 nm.

7. The reflector of claim 1, wherein the titanium dioxide comprises coated titanium dioxide, where the titanium dioxide is coated with alumina and/or polysiloxane.

8. The reflector of claim 1, wherein the titanium dioxide comprises rutile titanium dioxide.

9. The reflector of claim 1, wherein when exposed to an LED light in a light box with 6 LED lights (GE-Tetra LED System 5 Amp max output 20 watts) for 2,000 hours, a 3.2 mm plaque formed from the composition has a color change of less than or equal to 0.5 DE.

10. The reflector of claim 1, wherein the composition is able to achieve a UL94 V0 rating at 1.5 mm.

11. The reflector of claim 1, wherein the composition further comprises potassium diphenylsulfone sulfonate and/or polytetrafluoroethylene encapsulated by the rigid copolymer of styrene-acrylonitrile copolymer.

12. The reflector of claim 1, wherein the reflector is free of a metal coating.

13. The reflector of claim 1, comprising a reflective surface having a reflectivity of greater than or equal to 95%, and wherein the reflective surface is free of metallization.

14. An illumination device, comprising:
    a reflector of claim 1;
    an LED; and
    means for providing power to the LED.

15. A method of reflecting light comprising:
    illuminating a reflective surface of a reflector of claim 1 with light from an LED.

16. A reflector comprising a polycarbonate composition, wherein the polycarbonate composition comprises:
    a polycarbonate, wherein the polycarbonate is interfacially polymerized from a bisphenol A having an organic purity of greater than 99.65 wt % and a sulfur level of less than 2 ppm; wherein the polycarbonate has a free hydroxy level of less than 150 ppm;
    10 to 20 wt % titanium dioxide;
    a flame retardant; and
    an optional UV stabilizer;
    wherein the polycarbonate composition has a maximum reflectance of greater than or equal to 95% as determined by reflectance measurements using a Gretag Macbeth Coloreye spectrophotometer (D65 light source, 10 degree observer, UV included) made at a wavelength of 680 nm; and
    wherein the melt volume rate of the composition as determined at 300° C. using a 1.2 kilogram weight, in accordance with ASTM D1238-04 is from 5 to 30 grams per 10 minutes, and
    wherein, when in the form of a 1.5 mm plaque, the composition achieves a probability of first time pass of greater than or equal to 85%; and
    wherein a molded article of the polycarbonate has transmission level greater than or equal to 90.0% at 2.5 mm thickness as measured by ASTM D1003-00 and a yellow index (YI) less than or equal to 1.5 as measured by ASTM D1925.

17. The reflector of claim 16, wherein the polycarbonate composition consisting essentially of the polycarbonate, the titanium dioxide, the optional flame retardant; and the optional UV stabilizer has a reflectance of greater than or equal to 96%, as determined by reflectance measurements using a Gretag Macbeth Coloreye spectrophotometer (D65 light source, 10 degree observer, UV included) made at a wavelength of 680 nm.

18. The reflector of claim 1, wherein the composition relies only on the reflective agent to provide the high reflectivity.

19. The reflector of claim 18, wherein the reflectivity is greater than or equal to 96%.

* * * * *